US007826337B2

United States Patent
Shi et al.

(10) Patent No.: US 7,826,337 B2
(45) Date of Patent: Nov. 2, 2010

(54) COMMUNICATION NODE, WIRELESS COMMUNICATION SYSTEM AND DATA RELAY METHOD

(75) Inventors: Hui Shi, Yokohama (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 633 days.

(21) Appl. No.: 11/565,958

(22) Filed: Dec. 1, 2006

(65) Prior Publication Data

US 2007/0129008 A1    Jun. 7, 2007

(30) Foreign Application Priority Data

Dec. 2, 2005    (JP)    .............................. 2005-349727
Mar. 14, 2006    (JP)    .............................. 2006-069777

(51) Int. Cl.
*H04J 1/12*    (2006.01)

(52) U.S. Cl.    ........................ 370/201; 370/286; 370/315; 455/24

(58) Field of Classification Search .................. 370/201, 370/286, 287, 288, 289, 290, 291, 292, 315, 370/316, 317
See application file for complete search history.

(56) References Cited

U.S. PATENT DOCUMENTS

| 7,430,397 | B2 * | 9/2008 | Suda et al. ...................... 455/7 |
| 2005/0141644 | A1 * | 6/2005 | Sadowsky ................... 375/324 |
| 2005/0170802 | A1 * | 8/2005 | Oh et al. .................. 455/226.1 |
| 2006/0229017 | A1 * | 10/2006 | Larsson et al. ............. 455/63.1 |
| 2006/0274836 | A1 * | 12/2006 | Sampath et al. ............. 375/242 |

OTHER PUBLICATIONS

Rohit U. Nabar, et al., "Capacity Scaling Laws in MIMO Wireless Networks", Allerton Conference on Communication, Control, and Computing, Monticello, IL., Oct. 2003, pp. 378-389.
Hui Shi, et al., "A Relaying Scheme Using QR Decomposition with Phase Control for MIMO Wireless Networks", IEEE International Conference on Communications, vol. 4, May 16-20, 2005, pp. 2705-2711.
G.D. Golden, et al., "Detection Algorithm and Initial Laboratory Results Using V-BLAST Space-Time Communication Architecture", Electronics Letters, vol. 35, No. 1, Jan. 7, 1999, pp. 14-16.
Hui Shi, et al., "A 'Spatial Division Duplex' Relaying Approach for MIMO Relay Networks", IEICE Technical Report, RCS2005-167, vol. 105, No. 560, Jan. 20, 2006, pp. 71-76.

* cited by examiner

*Primary Examiner*—Jayanti K. Patel
*Assistant Examiner*—Bo Hui A Zhu
(74) *Attorney, Agent, or Firm*—Oblon, Spivak, McClelland, Maier & Neustadt, L.L.P.

(57) ABSTRACT

A communication node for relaying a signal between a source node and a destination node is disclosed. The communication node includes: a relay signal generation unit configured to generate a transmit signal by reducing, from a receive signal, an interference signal from another communication node and performing a process such that the transmit signal is not received as an interference signal by another communication node.

13 Claims, 14 Drawing Sheets

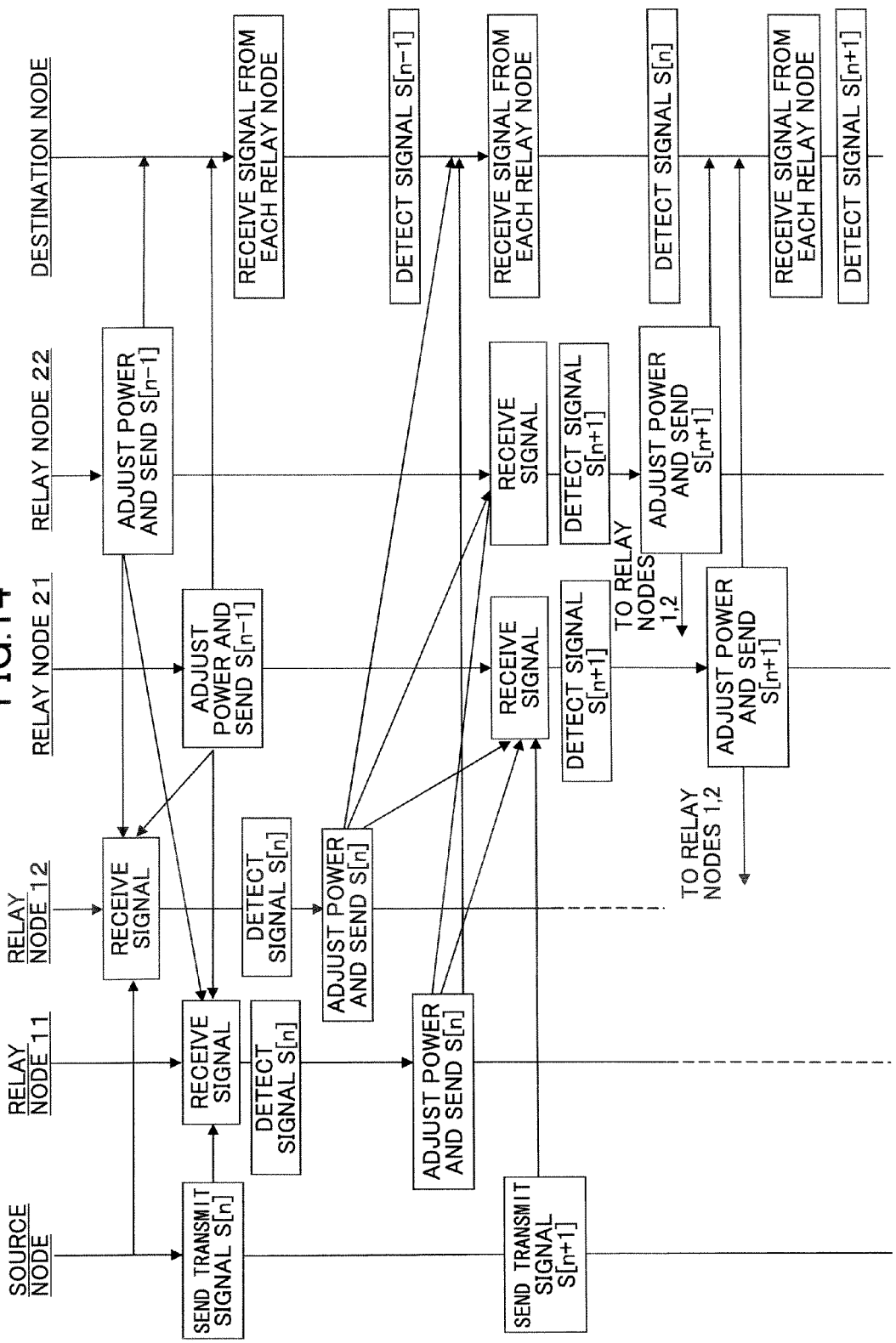

COMMUNICATION NODE, WIRELESS COMMUNICATION SYSTEM AND DATA RELAY METHOD

BACKGROUND OF THE INVENTION

1. Field of the Invention

The present invention generally relates to a wireless communication technical field. More particularly, the present invention relates to a communication node, a wireless communicant system and a data relay method that use the multi-hop scheme, the relay scheme and the MIMO (Multi-Input Multi-Output) scheme.

2. Description of the Related Art

In a conventional relay method, signal transmission and signal receiving are performed in a time division manner such that a transmit signal and a receive signal does not interfere with each other at the relay node. However, communication capacity is largely reduced due to the time division scheme so that the communication capacity of the relay system is limited.

The conventional relay method is described with reference to FIG. 1. The reason why the communication capacity is largely limited is described in the following.

In FIG. 1, following parameters are defined.

s: a transmit signal vector sent from a source node
r: a receive signal vector
K: a number of usable relay nodes
$H_k$: a k-th channel between source node and relay node (backward channel), $1 \leq k \leq K$
$G_k$: a k-th channel between relay node and receive node (forward channel), $1 \leq k \leq K$
$W_k$: weight matrix in the k-th relay node, $1 \leq k \leq K$
$E_k$: power limit coefficient in the k-th relay node $1 \leq k \leq K$ (for limiting maximum power in each relay node)
$n_k$: noise component in the k-th relay node
z: noise component of receive node
$E(\cdot)$: ensemble mean value of variable As shown in FIG. 1, a receive signal that is sent from a source node 1 using plural antennas and that is received by each relay node 2 can be represented as an equation (1).

$$y_k = H_k s + n_k \tag{1}$$

The relay node 2 multiplies this signal by the power limit coefficient $E_k$ and the weight matrix $W_k$ to produce a relay transmit signal as shown in the following equation (2).

$$X_k = E_k W_k y_k \tag{2}$$

As a result, a receive signal at a destination node 3 can be represented as the following equation (3).

$$r = \sum_{k=1}^{K} G_k x_k + z \tag{3}$$

When transmission and receiving are performed simultaneously in each relay node, a signal sent from a relay node is received by another relay node so that interference occurs. As a result, the relay node cannot properly receive a signal sent from the source node 1.

Therefore, in the conventional relay method, as shown in FIG. 1, a time slot in which the source node 1 sends a signal and the relay node receives the signal and a time slot in which the relay node sends a signal and the destination node 3 receives the signal are separately provided. Thus, two time sols are necessary for information sent from the source node 1 to arrive at the destination node 3. Communication capacity of this case is represented as the following equation (4).

$$C_{upper} = E_{(Hk,Gk)}\{(1/2)I(s;y_1 \ldots, y_K, r | X_1, \ldots, X_K)\} \tag{4}$$

The term of "½" in the equation (4) is caused by the fact that the two time slots are used. Therefore, the communication capacity is limited as a whole.

By the way, there are following documents relating to the technical field of the present invention.

Non patent document 1: Rohit U. Nabar, et al., "Capacity Scaling Laws in MIMO Wireless networks", Allerton Conference on Communication, Control, and Computing, Monticello, Ill. pp. 378-389, October 2003.

Non patent document 2: Hui Shi, et al., "A Relaying Scheme using QR Decomposion with Phase Control for MIMO Wireless Networks," IEEE International Conference on Communications, Volume 4, 16-20 May 2005 Page(s): 2705-2711.

Non patent document 3: G. D. Golden, G. J. Foschini, R. A. Valenzuela, and P. W. Wolniansky, "Detection Algorithm and Initial Laboratory Results using the V-Blast Space-Time Communication Architecture", Electronic Letters, Vol. 35, No. 1, Jan. 7, 1999.

The above-mentioned conventional technique has a following problem.

As mentioned above, in the conventional relay system, the time slot in which the source node 1 sends a signal and the relay node receives the signal, and the time slot in which the relay node sends a signal and the destination node 3 receives the signal are separately used. By separately providing the time for the relay node to send a signal and the time for the relay node to receive a signal, interference among plural antennas in a relay node and interference among relay nodes can be avoided. However, as represented by the multiplication of "½" in the equation (4) representing the communication capacity, there is a problem in that the communication capacity is reduced.

SUMMARY OF THE INVENTION

An object of the present invention is to provide a relay node, a destination node and a communication method for improving the communication capacity in the multi-hop scheme or the relay scheme using the MIMO scheme.

The object can be achieved by a communication node for relaying a signal between a source node and a destination node, including:

a relay signal generation unit configured to generate a transmit signal by reducing, from a receive signal, an interference signal from another communication node and performing a process such that the transmit signal is not received as an interference signal by another communication node.

The present invention can be also configured as a communication node for receiving a signal sent from a source node via a relay node, including:

an interference canceling unit configured to cancel an interference signal caused between the relay nodes.

The present invention can be also configured as a wireless communication system including a communication node for relaying a signal between a source node and a destination node, the communication node including:

a relay signal generation unit configured to generate a transmit signal by reducing, from a receive signal, an interference signal from another communication node and performing a process such that the transmit signal is not received as an interference signal by another communication node.

In addition, the present invention can be configured as a wireless communication system including a communication node for receiving a signal sent from a source node via a relay node, and the communication node including:

an interference canceling unit for canceling an interference signal between the relay nodes.

Further, the present invention can be configured as a data relay method in a wireless communication system including a relay node for relaying a signal between a source node and a destination node, the method including:

a channel estimation step of estimating channel information between the relay node and the source node, channel information between the relay node and another relay node, and channel information between the relay node and the destination node;

an interference canceling matrix calculation step of obtaining an interference canceling matrix for canceling an interference signal from another relay node based on the channel information between the relay node and the source node and the channel information between the relay node and another relay node; and a causing interference suppressing matrix calculation step of obtaining a causing interference suppressing matrix for suppressing interference to be caused by a transmitted signal sent by the relay node in another relay node based on the channel information between the relay node and the destination node;

a relay signal generation step of generating a relay signal by multiplying a receive signal by the interference canceling matrix and the causing interference suppressing matrix; and a relay signal sending step of sending the relay signal.

In addition, the present invention can be configured as a data relay method in a wireless communication system including a destination node for receiving a signal sent from a source node via a relay node, including:

a channel estimation step of estimating channel information which is a product of a channel between relay nodes and a channel between the destination node and the relay node, and estimating channel information between the destination node and the relay node;

a transmit signal estimation step of estimating a transmit signal based on the channel information estimated in the channel estimation step;

a storing step of storing the transmit signal estimated in the transmit signal estimation step;

an interference canceling step of canceling the interference signal based on the signal stored in the storing step and the channel information estimated in the channel estimation step; and a signal detection step of detecting the signal sent from the source node based on the receive signal from which interference is canceled.

According to the present invention, interference between relay nodes that send and receive signals can be cancels so that a relay node for receiving and a relay node for transmitting can coexist. Therefore, the communication capacity can be increased compared with the conventional relay method.

According to embodiments of the present invention, a communication node, a wireless communication system and a communication method for improving the communication capacity in the multi-hop scheme or the relay scheme using the MIMO scheme can be realized.

BRIEF DESCRIPTION OF THE DRAWINGS

Other objects, features and advantages of the present invention will become more apparent from the following detailed description when read in conjunction with the accompanying drawings, in which:

FIG. 14 is a flowchart showing a data relay method of an embodiment of the present invention.

DETAILED DESCRIPTION OF THE PREFERRED EMBODIMENTS

In the following, embodiments of the present invention are described with reference to figures. In all of the figures, same reference symbols are used for parts having the same function.

In embodiments of the present invention, interference canceling stands for canceling a signal from another communication node that is received as interference. Causing interference suppression stands for suppressing an influence to another relay node caused by a signal sent from a relay node.

In addition, in embodiments of the present invention, a matrix (interference canceling matrix) used for canceling a signal from another relay node is obtained by obtaining a Moor-Penrose inverse matrix using channel information (backward channel) between a relay node and a source node and channel information (inter-relay node channel) between the relay node and another relay node.

In addition, in embodiments of the present invention, a matrix (causing interference suppressing matrix) used for suppressing the influence to another relay node as interference caused by a signal sent from a relay node is obtained by obtaining a Moor-Penrose inverse matrix using channel information (forward channel) between the relay node and the destination node.

In the embodiments of the present invention, a relay signal is detected in the destination node by multiplying a receive signal received by the destination node by the Moor-Penrose inverse matrix of the channel information (forward channel) between the destination node and the relay node.

In addition, in the embodiments of the present invention, interference cancellation is performed in the destination node by subtracting, from the receive signal, a result obtained by multiplying the estimated relay signal by the inter-relay node channel and the backward channel.

In addition, in the embodiments of the present invention, interference cancellation is performed in the relay node by multiplying the relay receive signal by the Moor-Penrose inverse matrix of a product of the backward channel and the inter-relay node channel.

Further, in embodiments of the present invention, a signal can be detected in the destination node using a sequential type interference canceling method, for example (refer to the non-patent document 3, for example).

Following parameters are defined before describing a wireless communication system of the present embodiment.

Figure 1:
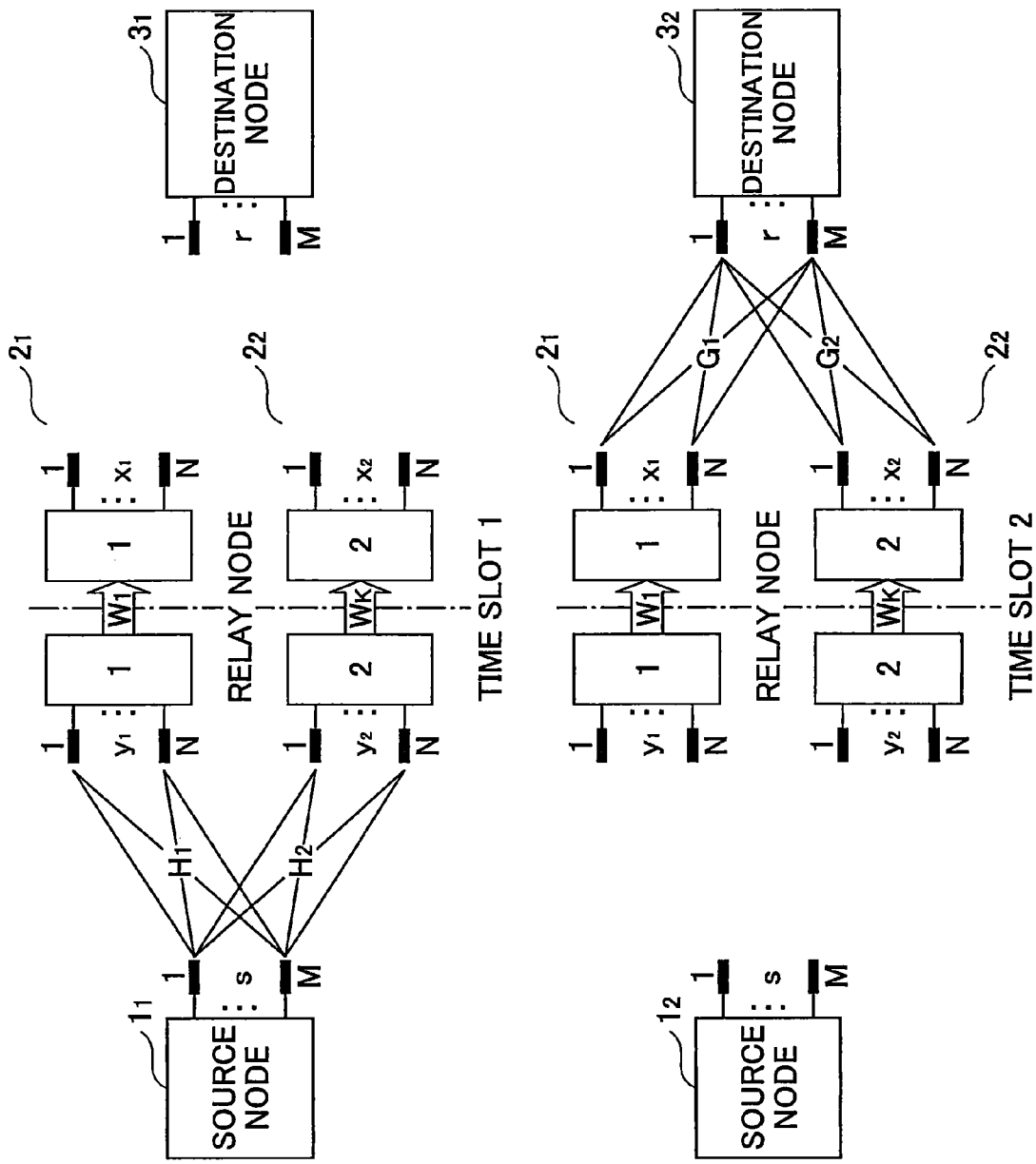
FIG. 1 is a block diagram of a wireless communication system.
Figure 2:
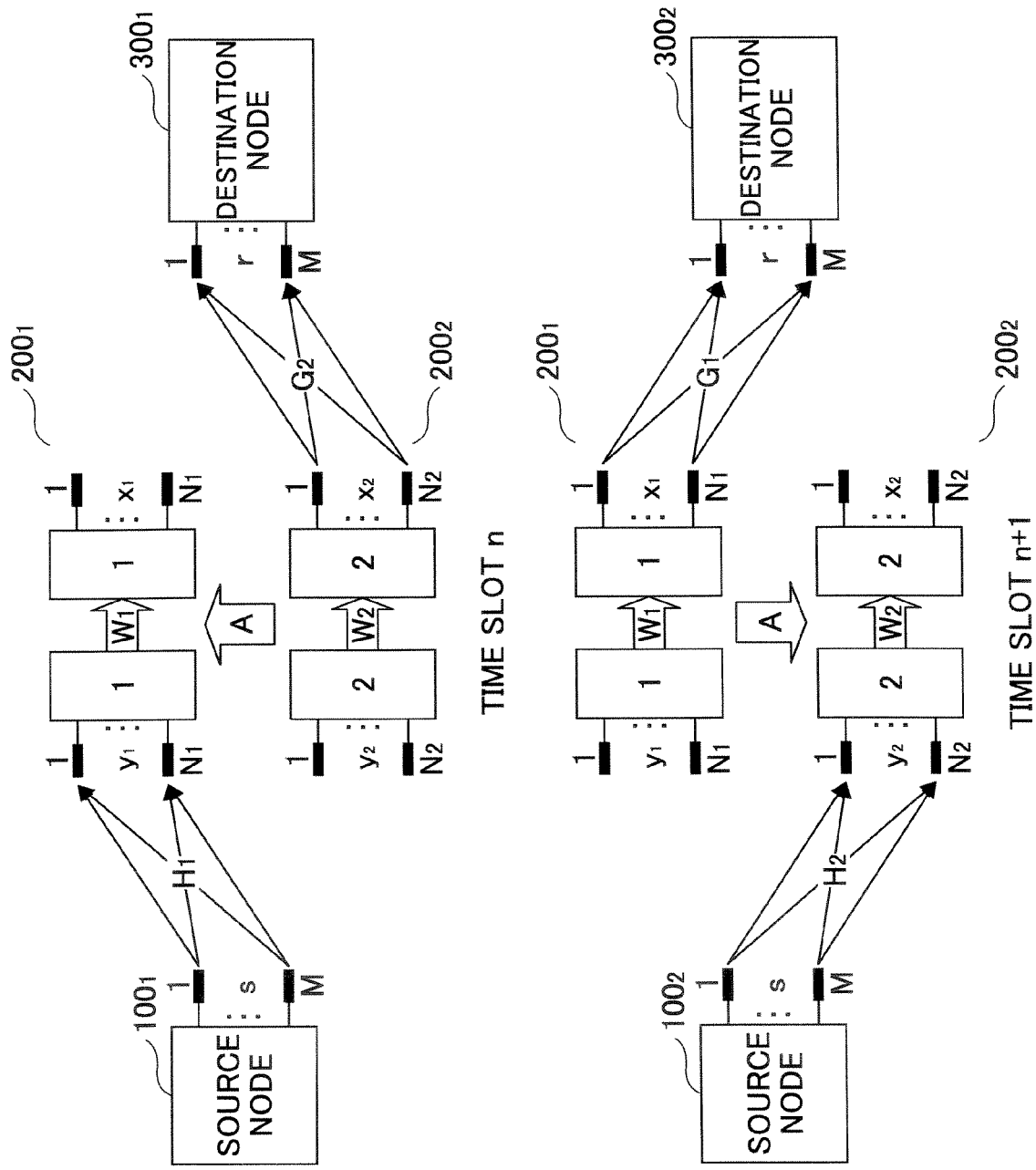
FIG. 2 is a block diagram of a wireless communication system of an embodiment of the present invention.

[n]: a variable of time provided to each variable, indicating a n-th time slot
s: a transmit signal vector from a source node
r: a receive signal vector
K: a number of usable relay nodes
$H_k$: k-th channel between source node and relay node (backward channel), $1 \leq k \leq K$
$G_k$: k-th channel between relay node and receive node (forward channel), $1 \leq k \leq K$
A: an inter-relay node channel matrix
$W_k$: a weight matrix in the k-th relay node, $1 \leq k \leq K$
$n_k$: noise component of the k-th relay node
z: noise component of the receive node
$\sigma_r^2$: noise power of a relay node (common to all relay nodes)
$\sigma_d^2$: noise power of a receive node
P: transmit power
E(·): ensemble mean value of variable
$B_{-kM}$: interference canceling matrix
$C_k$: interference suppressing matrix
$L_k$: pilot signal sent to k-th relay node
$Z_{kl}$: pilot signal sent from k-th relay node to l-th relay node The wireless communication system of this embodiment is described with reference to FIG. 2.

The wireless communication system of the embodiment includes plural communication nodes. The plural communication nodes can be divided to source nodes, relay nodes and destination nodes (receive nodes). A transmit signal sent from the source node is transmitted to a target node via one or more relay node.

The wireless communication system of the present embodiment includes a source node 100, relay nodes $200_1$ and $200_2$ and a destination node 300.

In this embodiment, an example is described in which the number K of the relay nodes is 2, the number of antennas of each of the source node 100 and the destination node 300 is M, the number $N_1$ of antennas of the relay node $200_1$ is 2M, and the number $N_2$ of antennas of the relay node $200_2$ is M. But, the number K of the relay nodes may be 1 or more than 2.

As shown in FIG. 2, in a time slot n, the relay node $200_1$ receives a signal (a signal vector may be referred to as a "signal" for the sake of simplicity of explanation) sent from the source node 100, and at the same time, the relay node $200_2$ sends a signal to the destination node 300.

In a next time slot n+1, the relay node $200_1$ sends a signal to the destination node 300, and at the same time, the relay node $200_2$ receives a signal sent from the source node 100.

That is, in each time slot, at least equal to or more than one relay node of the plural relay nodes receives a transmit signal from the source node, and at least equal to or more than one relay node that is different from the relay node that receives the transmit signal from the source node sends a signal to the destination node in the same time slot.

In the relay node, when neither interference cancellation nor causing interference suppression is performed, the relay node $200_1$ receives an influence caused by a signal as an interference signal component sent from the relay node $200_2$ in the time slot n.

In addition, in the time slot n+1, the relay node $200_2$ receives an influence caused by a signal as an interference signal component sent from the relay node $200_1$.

In the wireless communication system in this embodiment, the relay node 200 includes an interference canceling function and a causing interference suppressing function so that the influence of the interference can be reduced.

In this embodiment, a configuration is described in which the relay node $200_1$ includes the interference canceling function and the causing interference suppressing function, and the relay node $200_2$ does not require the interference canceling function and the causing interference suppressing function. But, instead of this configuration, another configuration can be adopted in which the relay node $200_2$ includes the interference canceling function and the causing interference suppressing function, and the relay node $200_1$ does not require the interference canceling function and the causing interference suppressing function. In addition, each of the relay nodes $200_1$ and $200_2$ may include the interference canceling function and the causing interference suppressing function.

Figure 3:
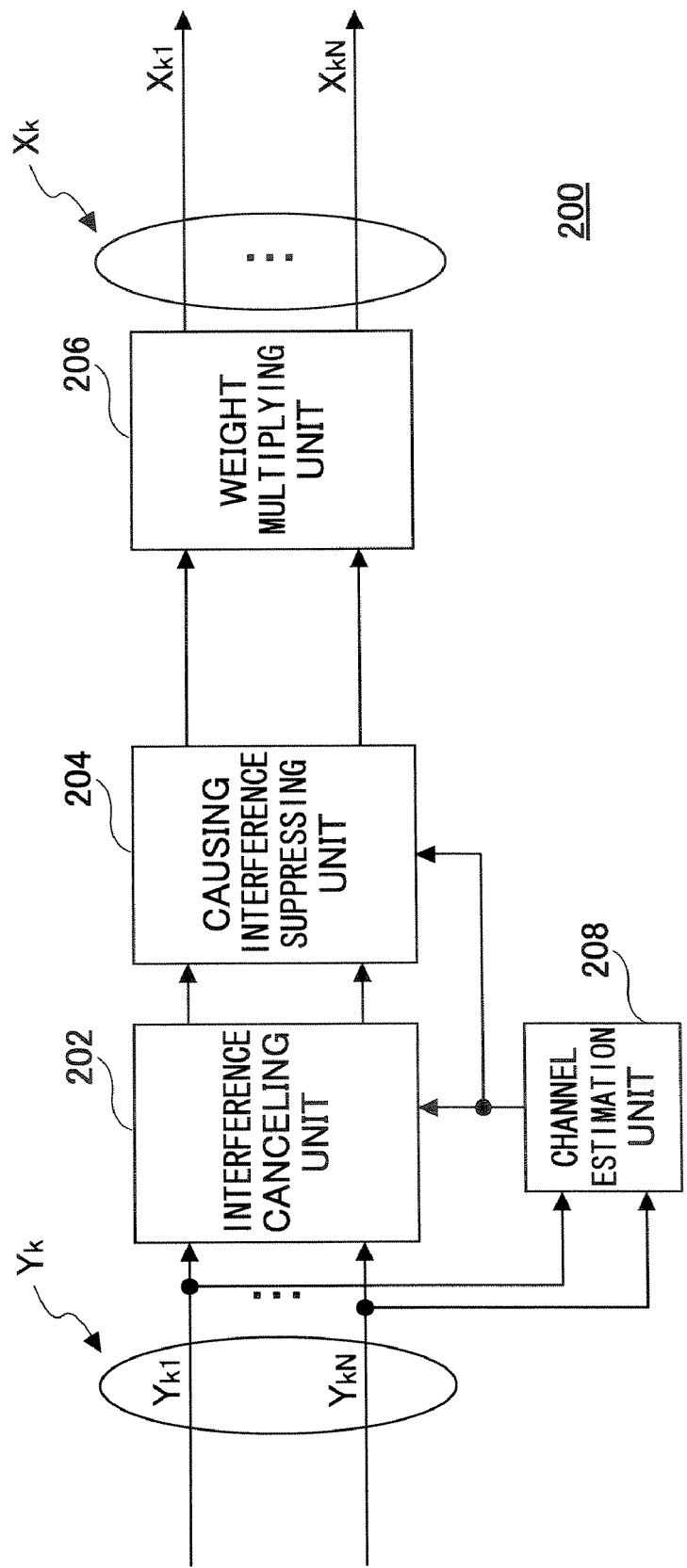
FIG. 3 is a block diagram of a relay node of an embodiment of the present invention.

A configuration of the relay node 200 in this embodiment is described with reference to FIG. 3. The relay node 200 is a communication node for relaying a signal between the source node and the destination node.

The relay node 200 includes an interference canceling unit 202 that receives a signal sent from the source node 100, a causing interference suppressing unit 204 that receives an output signal of the interference canceling unit 202, a weight multiplying unit 206 that receives an output signal of the causing interference suppressing unit 204 and that outputs a transmit signal, and a channel estimation unit 208 that receives a signal sent from the source node 100. The output signal of the channel estimation unit 208 is supplied to the interference canceling unit 202 and the causing interference suppressing unit 204.

The channel estimation unit 208 estimates channel information (forward channel) between the relay node and the destination node 300, channel information (backward channel) between the relay node and the source node 100, and channel information (inter-relay node channel) between the relay node and another relay node. In addition, the channel estimation unit 208 supplies the backward channel and the inter-relay node channel to the interference canceling unit 202, and supplies the forward channel to the causing interference suppressing unit 204.

The interference canceling unit 202 obtains a matrix (interference canceling matrix $B_{-kM}$) for canceling a signal from another node using the supplied backward channel and inter-relay node channel. The interference canceling unit 202 supplies the interference canceling matrix $B_{-kM}$ and a rely receive signal to the causing interference suppressing unit 204.

The causing interference suppressing unit 204 obtains a matrix (causing interference suppressing matrix $C_k$) using the supplied forward channel for suppressing causing interference such that a signal sent from the own relay node is not received by another relay node as an interference signal. In addition, the causing interference suppressing unit 204 supplies the interference canceling matrix $B_{-kM}$, the causing interference suppressing matrix $C_k$, and the relay receive signal to the weight multiplying unit 206.

The weight multiplying unit 206 multiplies the relay receive signal by the interference canceling matrix obtained by the interference canceling unit 202 and the causing interference suppressing matrix obtained by the causing interference suppressing unit 204.

Figure 4:
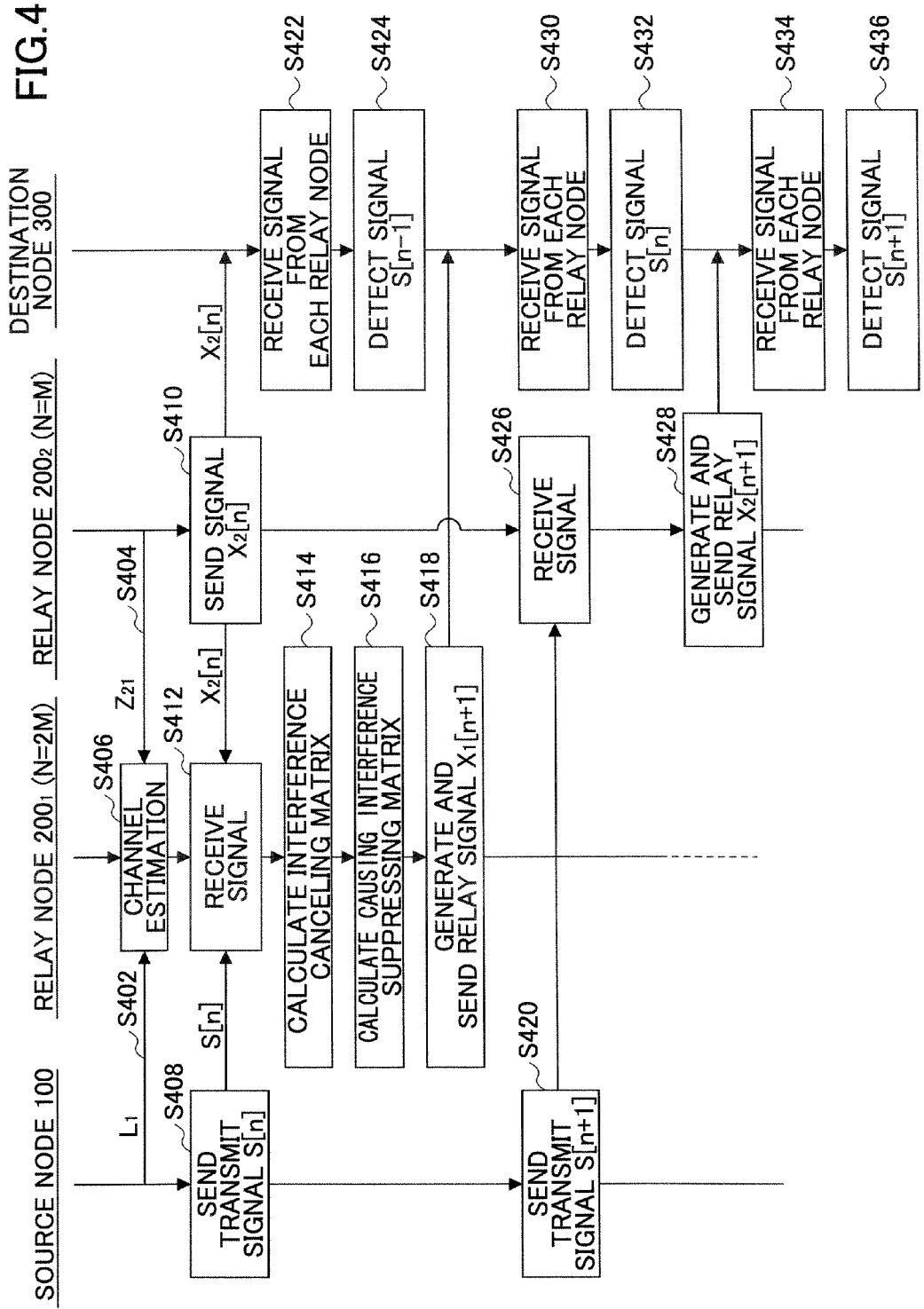
FIG. 4 is a flowchart showing a data relay method of an embodiment of the present invention.

Next, signal processing in the wireless communication system of this embodiment is described with reference to FIG. 4.

In this embodiment, since only the relay node $200_1$ generates the interference canceling matrix and the causing interference suppressing matrix, "k" is not shown in $B_{-km}$ and $C_k$ in the following descriptions.

First, the source node 100 sends a pilot signal $L_1$ in step S402. The relay node $200_2$ sends a pilot signal $Z_{21}$ in step S404.

The channel estimation unit 210 of the relay node $200_1$ performs channel estimation based on the pilot signals $L_1$ and $Z_{21}$ received from the source node 100 and the relay node $200_2$ respectively in step S406.

Next, in a n-th time slot, the source node 100 sends a signal s[n] to the relay node $200_1$ in step S408. At the same time, the relay node $200_2$ sends a signal $X_2[n]$ including information of s[n−1] to the destination node 300 in step S410.

The relay node $200_1$ receives the signal s[n] sent from the source node 100. In addition, the relay node $200_1$ receives the signal $X_2[n]$ sent from the relay node $200_2$ in step S412. Therefore, a signal $y_1[n]$ received by the relay node $200_1$ in the time slot n is represented as the following equation (5) as a sum of the signal sent from the source node 100 and the signal sent from the relay node $200_2$.

$$y_1[n]=H_1[n]s[n]+n_1[n]+A[n]X_2[n] \quad (5)$$

In the equation (5), $n_1[n]$ stands for a white noise component added in a receive amplifier in the relay node $200_1$.

Next, the interference canceling unit 202 of the relay node $200_1$ calculates the interference canceling matrix $B_{-kM}$ using the backward channel and the inter-relay node channel in step S414. The interference canceling unit 202 of the relay node $200_1$ supplies the interference canceling matrix $B_{-kM}$ and the relay receive signal to the causing interference suppressing unit 204.

Next, the causing interference suppressing unit 204 in the relay node $200_1$ calculates the causing interference suppressing matrix $C_k$ using the forward channel in step S416. In addition, the causing interference suppressing unit 204 supplies the interference canceling matrix $B_{-kM}$, causing interference suppressing matrix $C_k$ and the relay receive signal to the weight multiplying unit 206.

The weight multiplying unit 206 in the relay node $200_1$ generates a relay signal $X_1[n+1]$ by multiplying the relay receive signal by the supplied interference canceling matrix and causing interference suppressing matrix. The generated relay signal is sent to the destination node 300 in step S418. At the same time, the source node 100 sends s[n+1] to the relay node $200_2$ in step S420.

More particularly, the weight multiplying unit 206 of the relay node $200_1$ multiplies the receive signal $y_1[n]$ by the interference canceling matrix as shown in the following expression (6) so as to cancel a signal component received from the relay node $200_2$ as interference.

$$B[n]_{-M}^+ y_1[n] \quad (6)$$

In the expression (6), $B[n]=(H_1[n]A[n])$, and the number of elements of the matrix is 2M×2M. The following expression (7) shows a matrix obtained by performing Moor-Penrose inverse matrix conversion on the matrix B[n], and after that, converting elements from an (M+1)-th low to a 2M-th low to 0.

$$B[n]_{-M}^+ \quad (7)$$

As a result, a receive signal after multiplication by the interference canceling matrix is represented as the following equation (8).

$$B[n]_{-M}^+ y_1[n] = \{(s[n]+B[n]_{-M}^+ n_1[n])^T, 0_{1 \times M}\}^T \quad (8)$$

In the equation (8), T indicates transpose of the matrix.

Next, the weight multiplying unit 206 of the relay node $200_1$ multiplies the receive signal after multiplication by the interference canceling matrix by the causing interference suppressing matrix C[n] as shown in the following expression (9) such that interference is not provided to the relay node $200_2$ in generating a transmit signal of the relay node $200_1$.

$$C[n]B[n]_{-M}^+ y_1[n] \quad (9)$$

In the expression (9), C[n] is represented as the following equation (10)

$$C[n]=V[n]^H \quad (10)$$

In addition, as show in the equation (11), C[n] is defined by a matrix representing a signal part space of the inter-relay node channel A[n+1]. C[n] can be obtained by performing singular value decomposition on the inter-relay node channel A[n+1].

$$A[n+1] = [\tilde{U}[n], U[n]] \begin{bmatrix} \sum[n] & 0 \\ 0 & 0 \end{bmatrix} \begin{bmatrix} \tilde{V}[n]^H \\ V[n]^H \end{bmatrix} \quad (11)$$

A[n+1] indicates the inter-relay node channel when the relay node $200_1$ sends a signal in the time slot n+1. Instead of A[n+1], A[n] can be used when time variation of the channel is small.

As described above, a transmit signal $X_1[n+1]$ in a next time slot in the relay node $200_1$ can be represented as the following equation (12).

$$x_1[n+1]=C[n]B[n]_{-M}^+ y_1[n] \quad (12)$$

On the other hand, the destination node 300 receives the signal $X_2[n]$ including information of s[n−1] sent from the relay node $200_2$ in step S422. The receive signal is represented as the following equation (13).

$$r[n]=G_2[n]X_2[n]+z[n] \quad (13)$$

Then, the destination node 300 detects S[n−1] from the receive signal in step S424.

The signal sent from the source node 100 in step S420 is received by the relay node $200_2$ in step S426. The receive signal of the relay node $200_2$ in the time slot n+1 is represented by the following equation (14).

$$y_2[n+1]=H_2[n+1]s[n+1]+n_2[n+1] \quad (14)$$

In the equation (14), $H_2[n+1]$ indicates a matrix representing channel state of the backward channel between the source node 100 and the relay node $200_2$. The relay node $200_2$ sends the receive signal $y_2[n+1]$ as $X_2[n+2]$ in step S428.

On the other hand, in step S430, the destination node 300 receives the relay signal $X_1[n+1]$ sent from the relay node $200_1$ in step S418. This receive signal is represented by the following equation (15).

$$r[n+1]=G_1[n+1]X_1[n+1]+z[n+1] \quad (15)$$

Then, the destination node 300 detects S[n] from the receive signal in step S432.

Next, in step S434, the destination node 300 receives the relay signal sent from the relay node $200_2$ in step S428. The receive signal is represented by the equation (16).

$$r[n+2]=G_2[n+2]X_2[n+2]+z[n+2] \quad (16)$$

The destination node 300 detects s[n+1] from the receive signal in step S436.

As mentioned above, the receive signals in the destination node 300 that are sent from the source node 100 in time slots n and n+1 are represented as the equations (15) and (16) respectively.

$$r[n+1]=G_1[n+1]X_1[n+1]+z[n+1] \quad (15)$$

$$r[n+2]=G_2[n+2]X_2[n+2]+z[n+2] \quad (16)$$

In the equations, z indicates a noise component added in the receive amplifier in the destination node 300. In the destination node 300, signals s[n] and s[n+1] are detected from the equations (15) and (16).

As mentioned above, by providing, in the relay node $200_1$, the interference canceling (reducing) function canceling influence of the signal from the relay node $200_2$ and the causing interference canceling function for canceling interference provided to the relay node $200_2$, receiving by the relay node $200_1$ and sending by the relay node $200_2$ can be performed simultaneously.

In addition, since sending by the relay node $200_1$ and receiving by the relay node $200_2$ can be performed simultaneously, communication capacity can be increased compared with the conventional method in which sending and receiving are performed in different times in the relay node.

In this embodiment, as to the relay node including the interference canceling function and the causing interference suppressing function, the more the number of the antennas is, the better.

For example, assuming that the number of the antennas of a relay node that does not include the interference canceling function and the causing interference suppressing function is M and that the number of antennas of the source node 100 is M, when the relay node having the interference canceling function and the causing interference suppressing function performs zero-forcing type signal processing for realizing the interference canceling function and the causing interference suppressing function, it is necessary that the number of the antennas is equal to or greater than M×(number of relay nodes that does not have the interference canceling function and the causing interference suppressing function).

Next, a wireless communication system of a second embodiment of the present invention is described.

In the wireless communication system in this embodiment, the relay node 200 sends a received signal as it is. In addition, in the wireless communication system in this embodiment, a part of relay nodes perform receiving processes, and at the same time, other relay nodes perform sending processes.

In this situation, the destination node 300 of this embodiment cancels interference occurring between the relay nodes.

The configuration of the wireless communication system of this embodiment is the same as that of the wireless communication system described with reference to FIG. 2.

A configuration of the destination node 300 of this embodiment is described with reference to FIG. 5. The destination node 300 is a communication node that receives a signal sent from the source node via the relay node.

The destination node 300 includes a transmit signal estimation unit 302 that receives a signal sent from the relay node 200, an estimated signal storing unit 304 that receives an output signal of the transmit signal estimation unit 302, an interference canceling unit 306 that receives an output signal of the estimated signal storing unit 304, and a source node signal detection unit 308 that receives an output signal from the interference canceling unit 306, and a channel estimation unit 310 that receives the signal sent from the relay node 200. An output signal of the channel estimation unit 310 is supplied to the transmit signal estimation unit 302, the interference canceling unit 306 and the source node signal detection unit 308.

The transmit signal estimation unit 302 estimates the signal from the relay node 200 using the forward channel, and supplies the estimated signal to the estimated signal storing unit 304.

The estimated signal storing unit 304 stores the signal estimated by the transmit signal estimation unit 302.

The interference canceling unit 306 cancels interference using the signal stored in the estimated signal storing unit 304 and channel information obtained by multiplying the inter-node channel by the backward channel. For example, the interference canceling unit 306 cancels interference in a current time slot using the signal stored in the estimated signal storing unit 304 in a previous time slot.

The source node signal detection unit 308 detects a signal from the source node 100.

The channel estimation unit 310 estimates channel information that is a product of the forward channel, the inter-relay node channel and the backward channel. For example, the channel estimation unit 310 estimates channel information obtained by multiplying the inter-relay node channel by the channel between the destination node and the relay node, and estimates channel information between the destination node and the relay node.

Figure 6:
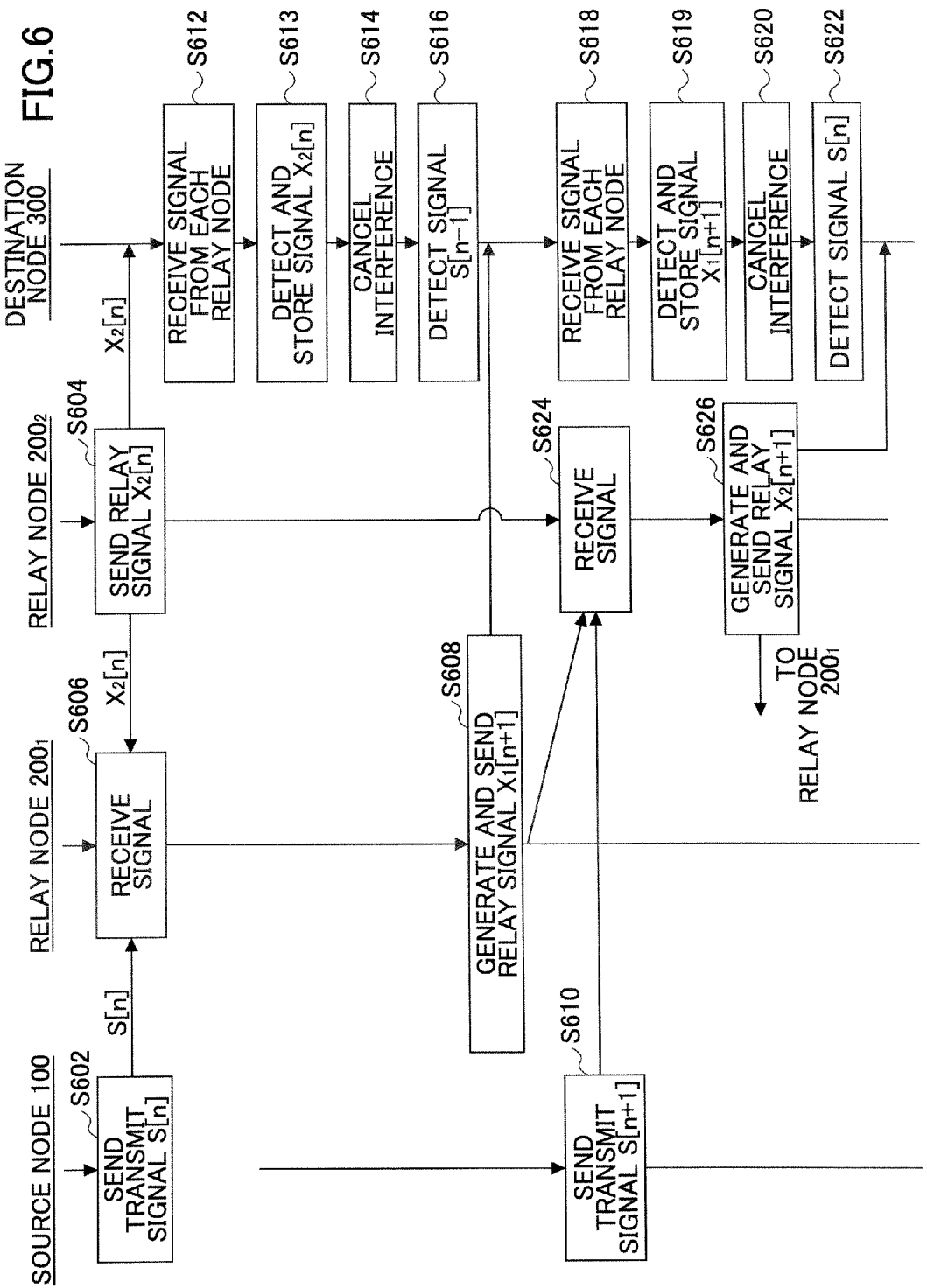
FIG. 6 is a flowchart showing a data relay method of an embodiment of the present invention.

Next, signal processing in the wireless communication system of this embodiment is described with reference to FIG. 6.

In this embodiment, after the relay node 200 adjusts power of a received signal, the relay node 200 sends the signal to the destination node 300 without performing either interference canceling or causing interference suppression.

In a time slot n, the source node 100 sends a transmit signal s[n] to the relay node $200_1$ in step S602. At the same time, the relay node $200_2$ sends a relay signal $X_2[n]$ to the destination node 300 in step S604.

The relay node $200_1$ receives a transmit signal s[n] and a relay signal $X_2[n]$ in step S606. In this case, the receive signal of the relay node $200_1$ is represented as the following equation (17).

$$y_1[n]=H_1[n]s[n]+n_1[n]+A[n]X_2[n] \quad (17)$$

After adjusting the power of the receive signal, the relay node $200_1$ sends a transmit signal $X_1[n+1]=y_1[n]$ to the destination node 300 in step S608. At the same time, the source node 100 sends a transmit signal s[n+1] to the relay node $200_2$ in step S610.

On the other hand, in step S612, the destination node 300 receives the relay signal sent from the relay node $200_2$ in step S604. This receive signal is represented as the following equation (18).

$$r[n]=G_2[n]X_2[n]+z[n] \quad (18)$$

The transmit signal estimation unit 302 of the destination node 300 detects the relay signal $X_2[n]$ from the receive signal r[n] and stores the detected signal in the estimated signal storing unit 304 in step S613.

Next, the destination node 300 cancels interference occurring between relay nodes using the receive signal in the previous time slot in step S614. For example, for the equation (19), the receive signal in the previous time slot n is represented as the following equation (19).

$$r[n-1]=G_1[n-1]X_1[n-1]+z[n-1] \quad (19)$$

$X_1[n-1]$ is estimated using channel information $G_1[n-1]$.

The interference occurring between relay nodes included in the receive signal in the time slot n can be canceled using the estimated value. More particularly, the interference signal component $X_1[n-1]$ is canceled from the receive signal.

Next, the transmit signal s[n-1] from the source node 100 is detected in step S616.

In step S618, the relay signal $X_1[n+1]$ sent in step S608 is received by the destination node 300 in a time slot n+1. The receive signal is represented by the following equation (20).

$$r[n+1]=G_1[n+1]X_1[n+1]+z[n+1]=G_1[n+1](H_1[n]s[n]+n_1[n]+A[n]X_2[n])+z[n+1] \quad (20)$$

The transmit signal estimation unit 302 of the destination node 300 detects the relay signal $X_1[n+1]$ from the receive signal r[n+1] and stores the detected signal in the estimated signal storing unit 304 in step S619.

Next, the destination node 300 cancels interference occurring between the relay nodes using the receive signal in the previous time slot in step S620. For example, for the equation (20), the receive signal in a previous time slot n is represented as the following equation (21).

$$r[n]=G_1[n]X_2[n]+z[n] \quad (21)$$

$X_2[n]$ is estimated using channel information $G_1[n]$. For example, when Zero-forcing type signal detection is performed, the estimated value of $X_2[n]$ can be represented as the following equation (22).

$$\tilde{x}_2[n] = G_1[n]^+ r[n]$$
$$= G_1[n]^+ G_1[n]x_2[n] + G_1[n]^+ z[n] \quad (22)$$
$$= x_2[n] + G_1[n]^+ z[n]$$

By using the estimated value, interference occurring between the relay nodes included in the receive signal in the time slot n+1 can be canceled. More particularly, an interference signal component $X_2[n]$ is canceled from the receive signal using the equations (20) and (22) as follows.

$$r[n+1] - G_1[n+1]E_1[n]A[n]\tilde{x}_2[n] =$$
$$G_1[n+1]E_1[n](H_1[n]s[n] + n_1[n]) + z[n+1] + n_{err} \quad (23)$$

In step S622, the destination node 300 detects the transmit signal s[n] from the source node 100 using the equation (23). In the equation, $n_{err}$ is a difference between a real value of $X_2[n]$ and the estimated value.

In step S624, the relay node $200_2$ receives s[n+1] sent in step S610 and $X_1[n+1]$ sent in step S608. In this case, the receive signal received by the relay node $200_2$ is represented as the equation (24).

$$y_2[n+1]=H_2[n+1]s[n+1]+n_2[n+1]+A[n+1]X_1[n+1] \quad (24)$$

After adjusting power of the receive signal, the relay node $200_2$ sends a transmit signal $X_2[n+2]=y_2[n+1]$ to the destination node 300 in step S626.

In addition, the transmit signal $X_2[n+2]$ is also received by the relay node $200_1$.

As mentioned above, since the destination node 300 cancels interference occurring between the relay nodes, the relay nodes $200_1$ and $200_2$ can perform signal transmission simultaneously.

In addition, signal transmission by the relay node $200_1$ and signal receiving by the relay node $200_2$ can be performed simultaneously.

Thus, compared with the conventional method in which transmission and receiving are performed in different times in the relay nodes 200, communication capacity can be increased.

Different from the first embodiment, in the wireless communication system of this embodiment, there is no limitation for the numbers N and M of the antennas.

Next, a wireless communication system of a third embodiment is described.

In the wireless communication system of this embodiment, each relay node performs signal detection so as to cancel interference between relay nodes. Accordingly, the signal from which interference is canceled in the relay nodes can be sent without performing causing interference suppression. In addition, it is not necessary that the destination node 300 performs interference cancellation between relay nodes.

The configuration of the wireless communication system of this embodiment is the same as that shown in FIG. 2.

Figure 7:
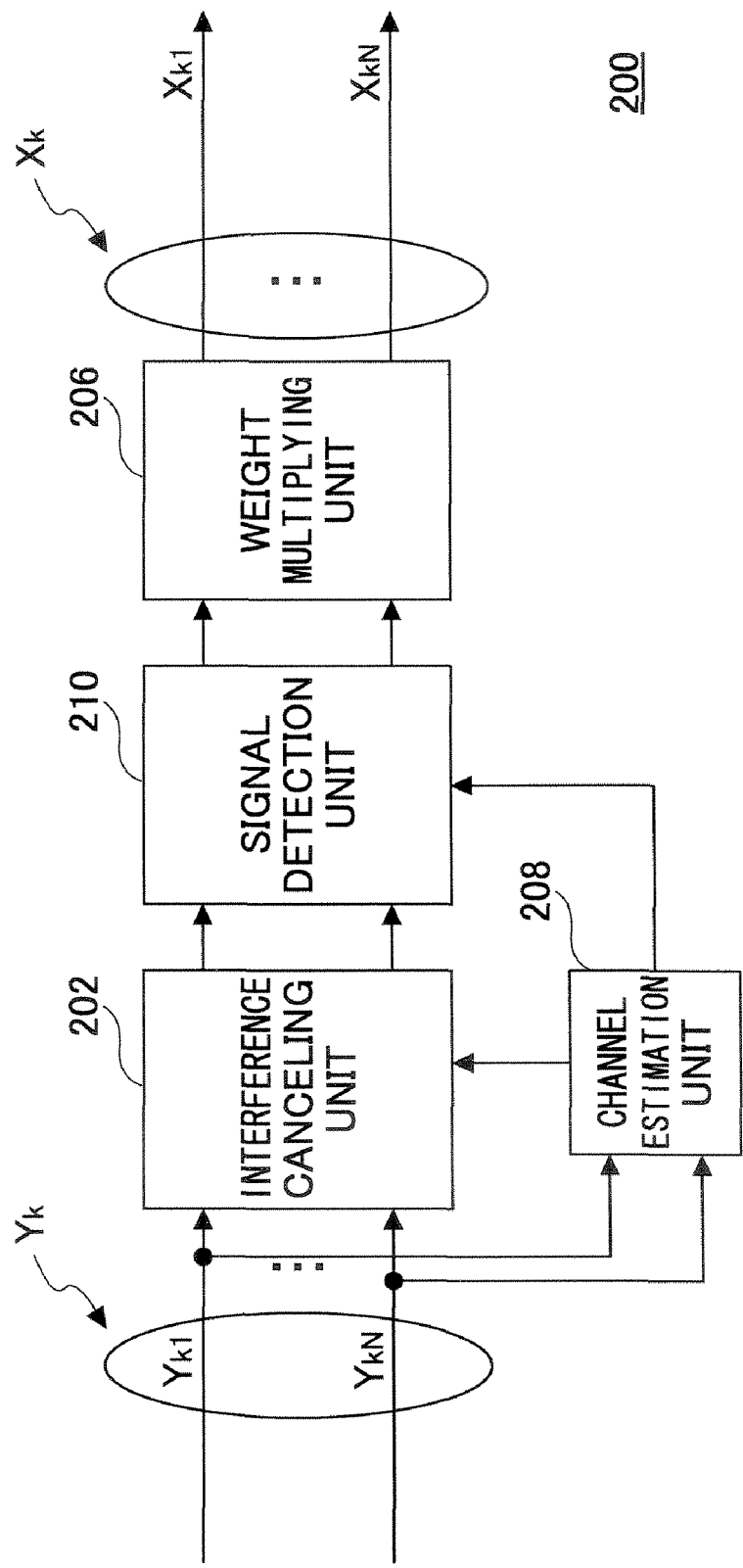
FIG. 7 is a block diagram of a relay node of an embodiment of the present invention.

A configuration of the relay node 200 of this embodiment is described with reference to FIG. 7. The relay node 200 is a communication node for relaying a signal between the source node and the destination node.

The relay node 200 includes an interference canceling unit 202 that receives a receive signal, a signal detection unit 210 that receives an output signal of the interference canceling unit 202, a weight multiplying unit 206 that receives an output signal of the signal detection unit 210, and a channel estimation unit 208 that receives the receive signal. An output signal of the channel estimation unit 208 is supplied to the interference canceling unit 202 and the signal detection unit 210.

The interference canceling unit 202 cancels a signal from another node when receiving a signal from the source node using channel information (backward channel) between the source node 100 and the relay node 200 and channel information (inter-relay node channel) between the own relay node and another relay node. In addition, the interference canceling unit 202 supplies the receive signal from which interference is canceled to the signal detection unit 210.

The signal detection unit 210 detects a signal sent from the source node by performing signal decision using the signal from which interference is canceled. For example, the signal detection unit 210 detects a desired signal using channel information of the backward channel.

The weight multiplying unit 206 multiplies an output of the signal detection unit 210 by a weight to generate a transmit signal.

The channel estimation unit 208 estimates channel information of the backward channel and the inter-relay node channel.

Figure 8:
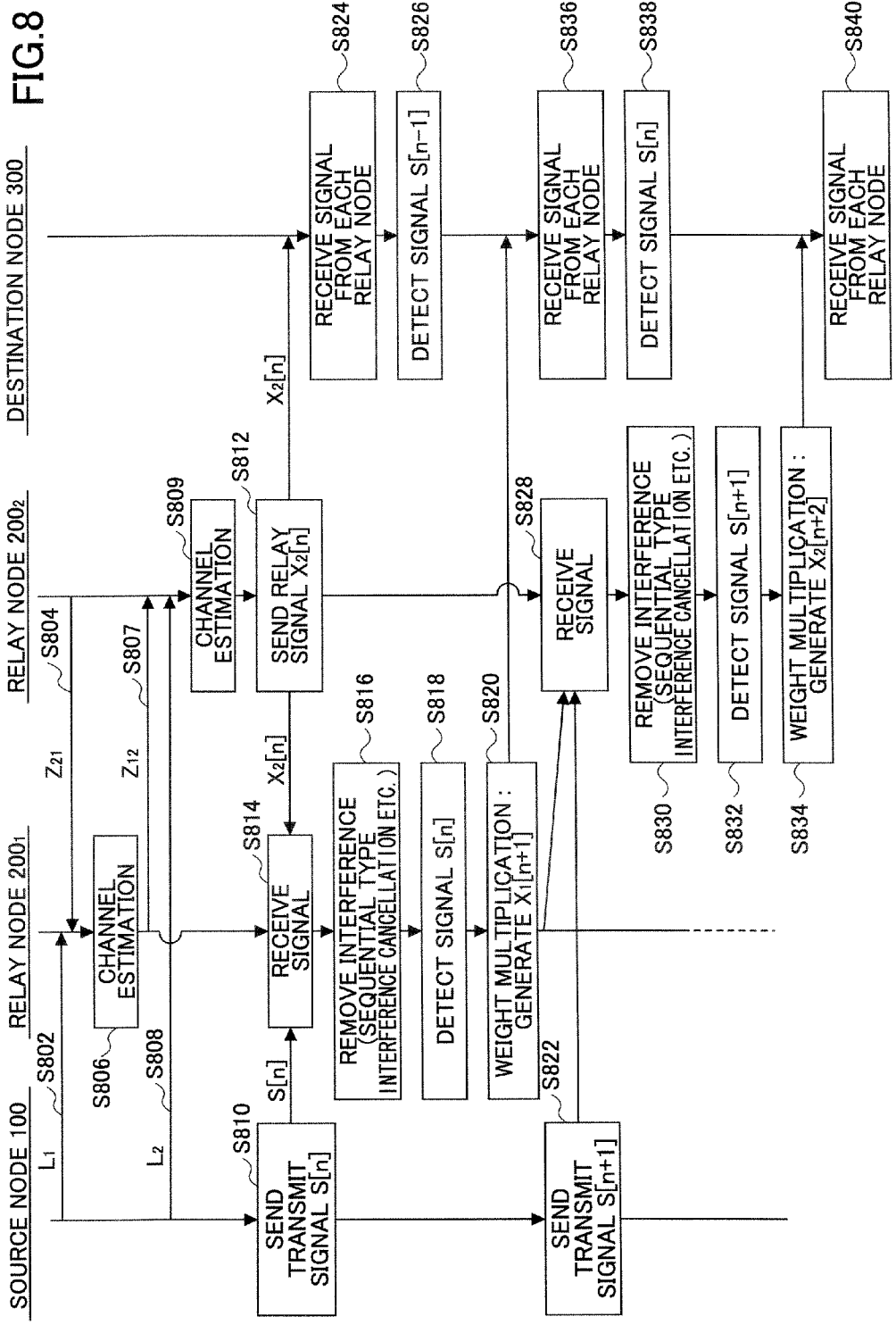
FIG. 8 is a flowchart showing a data relay method of an embodiment of the present invention.

Next, signal processing of the wireless communication system of this embodiment is described with reference to FIG. 8.

Although non-regenerative relay is described in the first and second embodiments, regenerative relay is described in this embodiment. In this embodiment, the number of the antennas of each relay node is N(N=2M).

First, the source node 100 sends a pilot signal $L_1$ in step S802. The relay node 200₂ sends a pilot signal $Z_{21}$ in step S804.

The channel estimation unit 210 of the relay node 200₁ performs channel estimation based on the pilot signals $L_1$ and $Z_{21}$ sent from the source node 100 and the relay node 200₂ respectively in step S806.

Next, the relay node 200₁ sends a pilot signal $Z_{12}$ in step S807. By the way, the relay node 200₁ may send the pilot signal $Z_{12}$ before performing the channel estimation in step S806.

Next, the source node 100 sends a pilot signal $L_2$ in step S808. The pilot signal $L_2$ may be the same as the pilot signal $L_1$.

The channel estimation unit 210 of the relay node 200₂ performs channel estimation based on the pilot signals $L_2$ and $Z_{12}$ sent from the source node 100 and the relay node 200₁ respectively in step S809.

Next, in the same way as the first embodiment, in the time slot n, the source node 100 sends a signal s[n] to the relay node 200₁ in step S810. At the same time, the relay node 200₂ sends a signal $X_2[n]$ including information of s[n−1] to the destination node 300 in step S812.

The relay node 200₁ receives the signal s[n] sent from the source node 100. In addition, the relay node 200₁ receives the signal $X_2[n]$ sent from the relay node 200₂ in step S814. Therefore, a signal $y_1[n]$ received by the relay node 200₁ in the time slot n is obtained by summing the signal sent from the source node 100 and the signal sent from the relay node 200₂ and is represented as the following equation (25).

$$y_1[n]=H_1[n]s[n]+n_1[n]+A[n]X_2[n] \qquad (25)$$

In the equation, $n_1[n]$ is a white nose component added in the receiving amplifier in the relay node 200₁.

Next, the interference canceling unit 202 of the relay node 200₁ cancels a signal from another node using the backward channel and the inter-relay node channel. In addition, the interference canceling unit 202 supplies the relay receive signal after interference is canceled to the signal detection unit 210 in step 816.

Next, the signal detection unit 210 detects the signal s[n] sent from the source node 100 by performing signal decision using the signal from which interference is canceled in step S818.

Next, the weight multiplying unit 206 multiplies an output of the signal detection unit 210 by a weight to generate a transmit signal $X_1[n+1]$. The generated relay signal is sent to the destination node 300 in step S820. At the same time, the source node 100 sends s[n+1] to the relay node 200₂ in step S822.

More particularly, the transmit signal $X_2[n]$ from the relay node 200₂ in the time slot n can be represented as the following equation (26).

$$x_2[n]=w_2[n-1]\tilde{s}[n-1] \qquad (26)$$

In the equation, $w_2[n]$ is a transmit weight of the relay node 200₂. The expression (27) indicates a decision value of s[n−1].

$$\tilde{s}[n-1] \qquad (27)$$

Transmit weights $w_1$ and $w_2$ of the relay nodes 200₁ and 200₂ can be represented as follows.

$$w_2[i] = w_1[i] \qquad (28)$$
$$= \begin{bmatrix} I_M \\ I_M \end{bmatrix}$$
$$i = 0, 1, 2 \ldots$$

By deforming the equation (25) using the equation (26), the receive signal of the relay node 200₁ can be represented as the following equation (29).

$$y_1[n] = H_1[n]s[n] + n_1[n] + A[n](w_2[n-1]\tilde{s}[n-1]) \qquad (29)$$
$$= (H_1[n]A[n]w_2[n-1])\begin{pmatrix} s[n] \\ \tilde{s}[n-1] \end{pmatrix} + n_1[n]$$

Accordingly, s[n] can be detected using the sequential type interference canceling method and the like for the equation (26). After that, the relay node 200₁ multiplies the detected s[n] by a weight matrix $w_1[n]$ so as to generate a transmit signal $X_1[n+1]$. As a result, the following equation (30) can be obtained.

$$x_1[n+1]=w_1[n]\tilde{s}[n] \qquad (30)$$

On the other hand, in step S824, the destination node 300 receives the signal $X_2[n]$ including information of s[n−1] sent from the relay node 200₂ in step S812. The receive signal is represented by the equation (31)

$$r[n]=G_2[n]X_2[n]+z[n] \qquad (31)$$

The destination node 300 detects S[n−1] from the receive signal in step S826.

On the other hand, the relay node 200₂ receives a signal s[n+1] sent from the source node 100. In addition, the relay node 200₂ receives the signal $X_1[n+1]$ sent from the relay node 200₁ in step S828. Therefore, a signal $y_2[n+1]$ received by the relay node 200₂ in the time slot n+1 is obtained by summing the signal sent from the source node 100 and the signal sent from the relay node 200₁ and is represented as the following equation (32).

$$y_2[n+1]=H_2[n+1]s[n+1]+n_2[n+1]+A[n+1]X_1[n+1] \qquad (32)$$

In the equation, $n_2[n+1]$ is a white nose component added in the receiving amplifier in the relay node 200₂.

Next, the interference canceling unit 202 of the relay node 200₂ cancels a signal from another node using the backward channel and the inter-relay node channel. In addition, the interference canceling unit 202 supplies the relay receive signal after interference is canceled to the signal detection unit 210 in step 830.

Next, the signal detection unit 210 detects the signal s[n+1] sent from the source node 100 by performing signal decision using the signal from which interference is canceled in step S832.

Next, the weight multiplying unit 206 multiplies an output of the signal detection unit 210 by a weight to generate a transmit signal $X_2[n+1]$. The generated relay signal is sent to the destination node 300 in step S834. At the same time, the source node 100 sends s[n+2] to the relay node $200_2$.

On the other hand, in step S836, the destination node 300 receives the relay signal $X_1[n+1]$ sent from the relay node $200_1$. The receive signal is represented as the equation (33)

$$r[n+1]=G_1[n+1]X_1[n+1]+z[n+1] \quad (33)$$

The destination node 300 detects S[n] from the receive signal in step S838.

Next, the destination node 300 receives the relay signal sent from the relay node $200_2$ in step S840. After that, similar processes are performed.

In this embodiment, as to the relay node including the interference canceling function, the more the number of the antennas is, the better. For example, assuming that the number of the antennas of each of the source node and the destination node is M, when the relay node performs zero-forcing type signal processing for realizing the interference canceling function, it is necessary that the number of the antennas is equal to or greater than twice as that of the antennas of the source node.

Next, a wireless communication system of a fourth embodiment of the present invention is described.

The wireless communication system of this embodiment is divided into two relay groups 1 and 2, wherein each group includes more than one relay node. Each relay node sends a received signal as it is or after amplifying it. In addition, in the wireless communication system of this embodiment, one relay group performs receiving processes at the same time when another relay group performs transmission processes.

Following parameters are defined before describing the wireless communication system of the present embodiment.

[n]: a variable of time provided to each variable, indicating a n-th time slot s: a transmit signal vector from a source node r: a receive signal vector K: a number of usable relay nodes in the relay group 1

L: a number of usable relay nodes in the relay group 2

$H_{ij}$: a channel (backward channel) between a source node and a j-th relay node in an i-th relay group, $1 \leq i \leq 2$, $1 \leq j \leq K$ when i=1, $1 \leq j \leq L$ when i=2

$G_{ij}$: a channel (forward channel) between a destination node and a j-th relay node in an i-th relay group, $1 \leq i \leq 2$, $1 \leq j \leq K$ when i=1, $1 \leq j \leq L$ when i=2

$A_{ij}$: a channel matrix between an i-th relay node of the relay group 1 and a j-th relay node of the relay group 2

$n_{ij}$: noise component of the j-th relay node of the i-th relay group z: noise component of the receive node $\sigma_r^2$: noise power of a relay node (common to all relay nodes)

$\sigma_d^2$: noise power of the receive node

P: transmit power

E(·): ensemble mean value of variable

The wireless communication system of this embodiment is described with reference to FIG. 9.

The wireless communication system of this embodiment includes plural communication nodes that are divided into a source node 100, relay nodes and a destination node (receive node) 300. A transmit signal sent from the source node 100 is transmitted to the destination node 300 via one or more relay nodes.

The wireless communication system of this embodiment includes a source node 100, a relay group 1 including plural relay nodes (more than one), a relay group 2 including plural relay nodes (more than one), and a destination node 300.

In this embodiment, an example is described in which the number of the relay nodes in each of the relay groups 1 and 2 is 2, the number of antennas of the source node is M, the number of antennas of the relay node is N, and the number of the antenna of the destination node is 2×N. But, each of the numbers K and L of the relay nodes in the relay groups may be more than two.

In the case, it is necessary that the number of antennas of the destination node 300 is MAX (K,L)×N, wherein MAX (K,L) is a function that returns a larger value between K and L. The number of the relay nodes may be different between the two relay groups.

Figure 9:
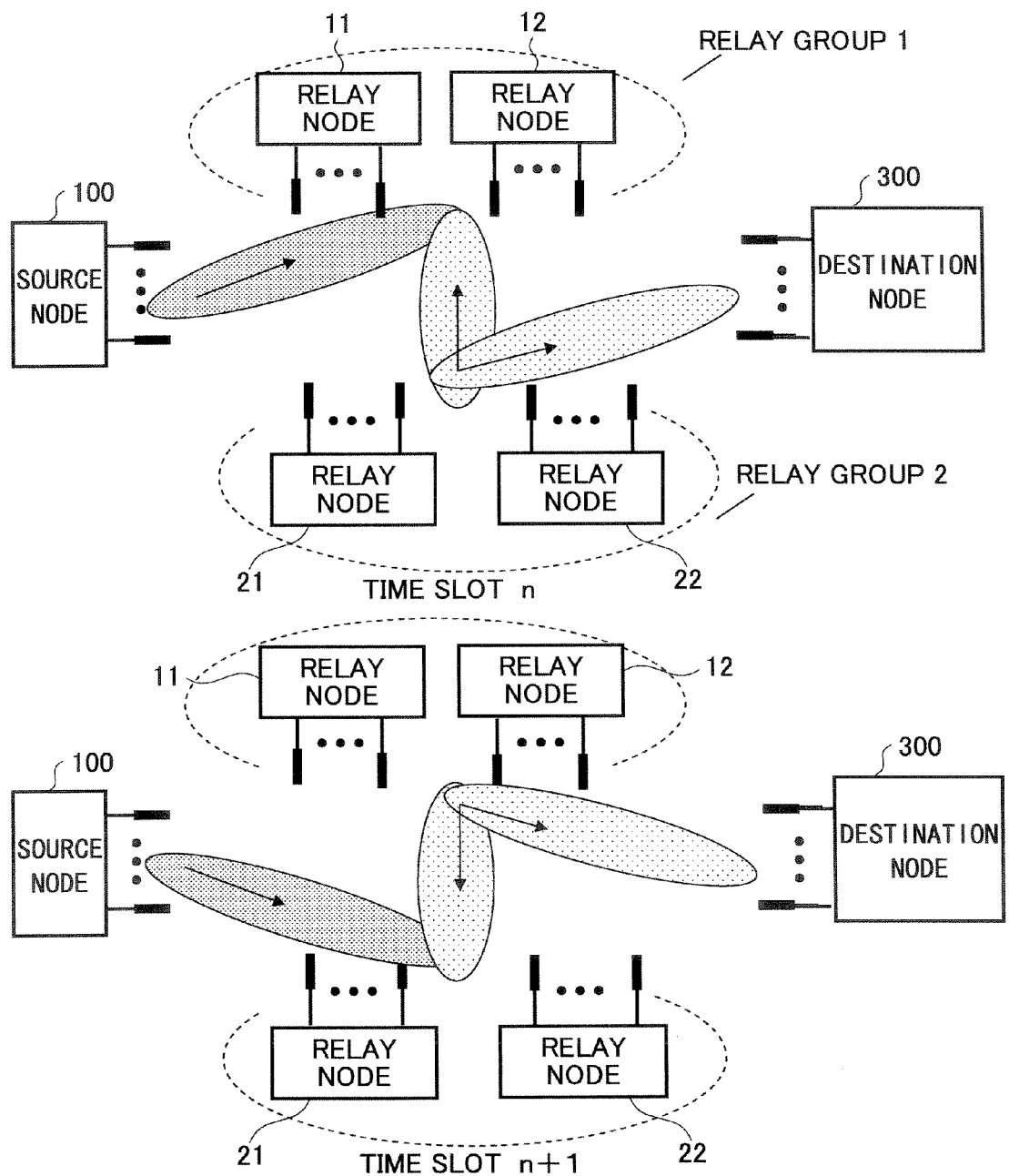
FIG. 9 is a block diagram of a wireless communication system of an embodiment of the present invention.

As shown in FIG. 9, in the time slot n, the relay nodes 11 and 12 belonging to the relay group 1 receives a signal sent from the source node 100, and at the same time, the relay nodes 21 and 22 belonging to the relay group 2 sends a signal to the destination node 300.

In a next time slot n+1, the relay nodes 11 and 12 belonging to the relay group 1 sends a signal to the destination node 300, and at the same time, the relay nodes 21 and 22 belonging to the relay group 2 receives a signal sent from the source node 100.

That is, in each time slot, at least equal to or more than two of the plural relay nodes belonging to one relay group receive a transmit signal from the source node 100, and at least equal to or more than two of the plural relay nodes belonging to another relay group sends a signal to the destination node 300 in the same time slot.

In the time slot n, the relay nodes 11 and 12 belonging to the relay group 1 receives an influence of the signal sent from the relay nodes 21 and 22 belonging to the relay group 2 as an interference signal component.

In the time slot n+1, the relay nodes 21 and 22 belonging to the relay group 2 receives an influence of the signal sent from the relay nodes 11 and 12 belonging to the relay group 1 as an interference signal component.

Figure 5:
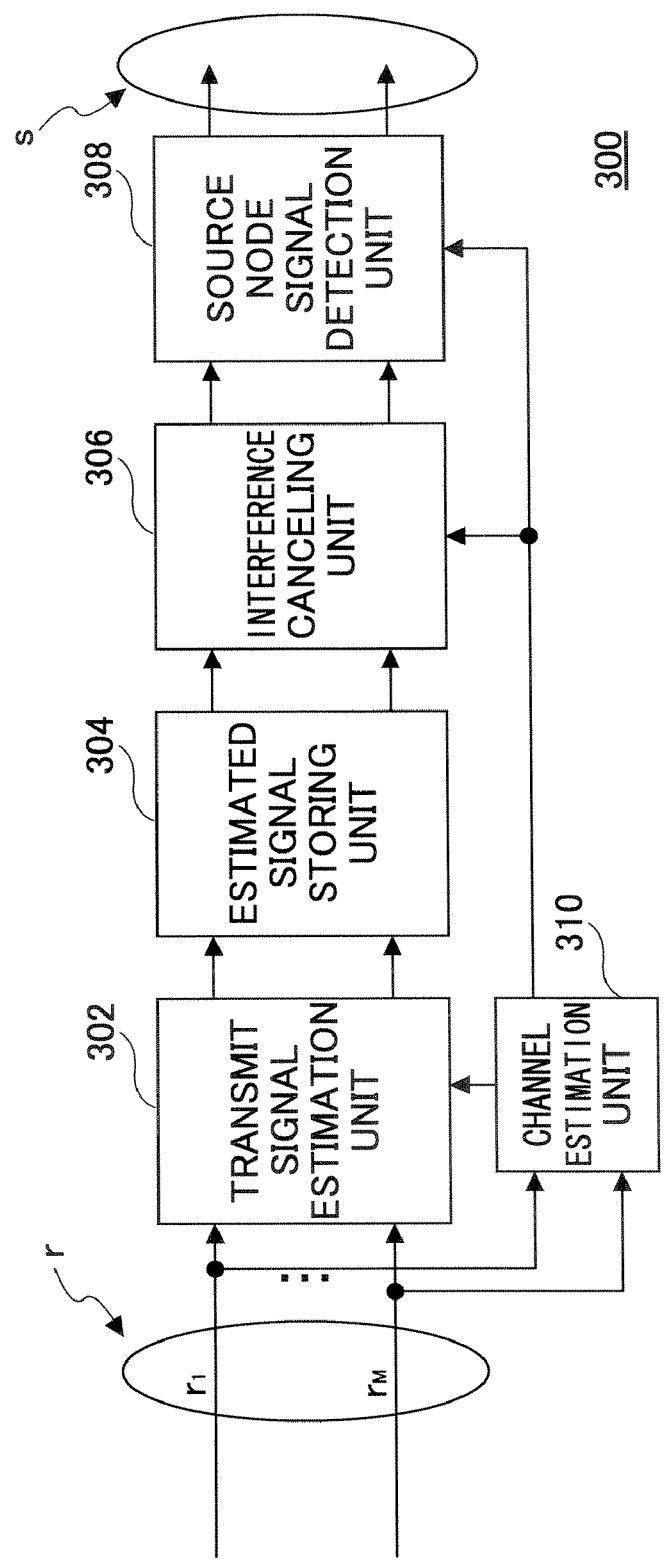
FIG. 5 is a block diagram of a destination node of an embodiment of the present invention.

The destination node 300 of this embodiment has the same configuration as one shown in FIG. 5, and includes a transmit signal estimation unit 302 that receives a signal sent from the relay nodes (11, 12) belonging to the relay group 1 or the relay nodes (21, 22) belonging to the relay group 2, an estimated signal storing unit 304 that receives an output signal of the transmit signal estimation unit 302, an interference canceling unit 306 that receives an output signal of the estimated signal storing unit 304, a source node signal detection unit 308 that receives an output signal from the interference canceling unit 306, and a channel estimation unit 310 that receives the signal sent from the relay node. An output signal of the channel estimation unit 310 is supplied to the transmit signal estimation unit 302, the interference canceling unit 306 and the source node signal detection unit 308.

The transmit signal estimation unit 302 estimates the signal from each relay node (11, 12, 21, 22) using the forward channel between the destination node 300 and the relay node, and supplies the estimated signal to the estimated signal storing unit 304.

The estimated signal storing unit 304 stores the signal estimated by the transmit signal estimation unit 302.

The interference canceling unit 306 realizes interference cancellation using products of the signals stored in the estimated signal storing unit 304 for each relay node, channels between each relay node and relay nodes of another relay group, and channels between the relay nodes and the destination node by subtracting, from the receive signal, a sum (estimated value) of signals obtained by multiplying the signals stored in the estimated signal storing unit 304 for each node by the combined channels.

The source node signal detection unit 308 detects a signal from the source node 100 using the signal from which interference is canceled from the receive signal by the interference removing unit 306.

The channel estimation unit 310 estimates forward channels for each relay node, and products of channels between each relay node and each relay node of another relay group and channels between relay nodes of another relay group and the destination node. For example, the channel estimation unit 310 estimates, as estimation of combined channel information on the relay node 11, a product of a channel between the relay node 11 and the relay node 21 and a forward channel between the relay node 21 and the destination node, and estimates a product of a channel between the relay node 11 and the relay node 22 and a forward channel between the relay node 22 and the destination node.

Figure 10:
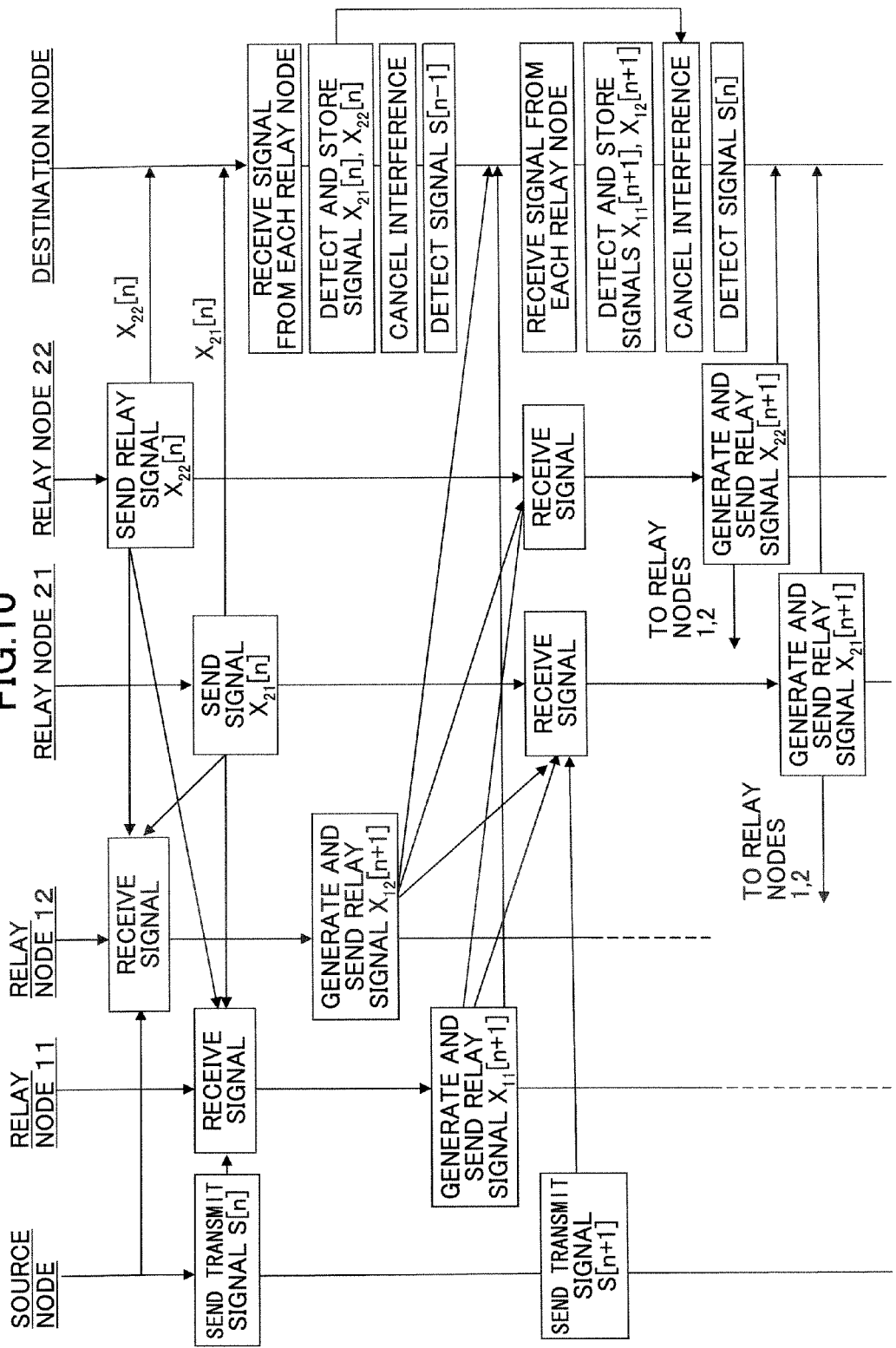
FIG. 10 is a flowchart showing a data relay method of an embodiment of the present invention.

Next, signal processing in the wireless communication system of this embodiment is described with reference to FIG. 10.

In this embodiment, after the relay node (11, 12, 21, 22) adjusts power of a received signal, the relay node sends the signal to the destination node 300.

In a time slot n, the source node sends a transmit signal s[n] to the relay nodes 11 and 12 belonging to the relay group 1. At the same time, the relay nodes 21 and 22 send relay signals $X_{21}[n]$, $X_{22}[n]$ to the destination node respectively.

Each of the relay nodes 11 and 12 receives a transmit signal s[n] and relay signals $X_{21}[n]$ and $X_{22}[n]$ from the relay group 2. In this case, the receive signal of the relay node 11 is represented as the following equation (34).

$$y_{11}[n] = H_{11}s[n] + n_{11} + \sum_{l=1}^{2} A_{l1}[n]x_{2l}[n] \tag{34}$$

The receive signal received by the relay node 12 is represented as the following equation (35).

$$y_{12}[n] = H_{12}s[n] + n_{12} + \sum_{l=1}^{2} A_{l1}[n]x_{2l}[n] \tag{35}$$

Since similar processing is performed in the relay nodes 11 and 12, only the processes of the relay node 11 are described in the following.

After multiplying the receive signal by $E_{11}[n+1]$ for adjusting the power of the receive signal, the relay node 11 sends a transmit signal $X_{11}[n+1]=E_{11}[n+1]y_{11}[n]$ to the destination node 300. At the same time, the source node 100 sends a transmit signal s[n+1] to the relay nodes 21 and 22 in the time slot n+1.

On the other hand, the receive signals at the destination node in the time slots n, n+1 and n+2 are represented as the following equations (36), (37) and (38) respectively.

$$r[n] = \sum_{l=1}^{2} G_{2l}[n]x_{2l}[n] + z \tag{36}$$

$$r[n+1] = \sum_{k=1}^{2} G_{1k}[n+1]x_{1k}[n+1] + z \tag{37}$$

$$r[n+2] = \sum_{l=1}^{2} G_{2l}[n+2]x_{2l}[n+2] + z \tag{38}$$

The transmit signal estimation unit 302 of the destination node 300 estimates the relay signals $X_{21}[n]$ and $X_{22}[n]$ from the receive signal r[n] and stores the estimated signals in the estimated signal storing unit 304. As an example, the relay signals $X_{21}[n]$ and $X_{22}[n]$ can be estimated using the Moore-Penrose inverse matrix of the forward channels of the relay group 2 as shown in the equation (39).

$$\begin{pmatrix} \tilde{x}_{21}[n] \\ \tilde{x}_{22}[n] \end{pmatrix} = \begin{pmatrix} G_{21}^+[n] \\ G_{22}^+[n] \end{pmatrix} r[n] \tag{39}$$

Next, the destination node 300 cancels interference occurring between relay nodes using the receive signals in the previous time slot. For example, interference occurring between relay nodes included in the receive signal in the time slot n+1 can be canceled using $X_{21}[n]$ and $X_{22}[n]$ estimated from the equation (39) for the equation (37). More particularly, the interference signal components $X_{21}[n]$ and $X_{22}[n]$ are canceled from the receive signal as follows.

$$r[n+1] - \sum_{k=1}^{2} G_{1k}E_{1k}[n] \sum_{l=1}^{2} E_{2l}[n-1]A_{l1}[n-1]H_{2l}s[n-1] = \tag{40}$$

$$\sum_{k=1}^{2} G_{1k}E_{1k}[n]\left(H_{1k}s[n] + n_{1k} + \sum_{l=1}^{2} A_{l1}[n]x_{2l}[n]\right) +$$

$$z - \sum_{k=1}^{2} G_{1k}E_{1k}[n] \sum_{l=1}^{2} A_{l1}[n]\tilde{x}_{2l}[n]$$

By performing the process shown in the equation (40), signal components on $X_{21}[n]$ and $X_{22}[n]$ are canceled so that interference is canceled. After that, the destination node 300 detects the transmit signal s[n] from the source node 100 using the signal from which the interference is canceled.

Next, a wireless communication system of a fifth embodiment of the present invention is described.

In the wireless communication system of this embodiment is divided into two relay groups 1 and 2, wherein each group includes more than one relay node. Each relay node sends a received signal as it is or after amplifying it. In addition, in the wireless communication system of this embodiment, one relay group performs receiving processes at the same time when another relay group performs transmission process.

Following parameters are defined before describing the wireless communication system of the present embodiment.

[n]: a variable of time provided to each variable, indicating a n-th time slot s: a transmit signal vector from a source node r: a receive signal vector K: number of usable relay nodes in the relay group 1

L: number of usable relay nodes in the relay group 2

$H_{ij}$: channel (backward channel) between a source node and a j-th relay node in an i-th relay group, $1 \leq i \leq 2$, $1 \leq j \leq K$ when i=1, $1 \leq j \leq L$ when i=2

$G_{ij}$: channel (forward channel) between a destination node and a j-th relay node in an i-th relay group, $1 \leq i \leq 2$, $1 \leq j \leq K$ when i=1, $1 \leq j \leq L$ when i=2

$A_{ij}$: channel matrix between an i-th relay node of the relay group 1 and a j-th relay node of the relay group 2

$n_{ij}$: noise component of the j-th relay node of the i-th relay group z: noise component of receive node $\sigma_r^2$: noise power of a relay node (common to all relay nodes)

$\sigma_d^2$: noise power of a receive node

P: transmit power

E(·): ensemble mean value of variable

The wireless communication system of this embodiment is described with reference to FIG. 9.

The wireless communication system of this embodiment includes plural communication nodes that are divided into a source node (source node) 100, relay nodes and a destination node (receive node) 300. A transmit signal sent from the source node 100 is transmitted to the destination node 300 via one or more relay node.

The wireless communication system of this embodiment includes a source node 100, a relay group 1 including plural relay nodes (more than one), a relay group 2 including plural relay nodes (more than one), and a destination node 300.

In this embodiment, an example is described in which the number of the relay nodes in each of the relay groups 1 and 2 is 2, the number of antennas of each of the source node 100 and the destination node is M, the number of antennas of the relay node is N. But, each of the numbers K and L of the relay nodes in the relay groups may be more than two.

As shown in FIG. 9, in the time slot n, the relay nodes 11 and 12 belonging to the relay group 1 receives a signal sent from the source node 100, and at the same time, the relay nodes 21 and 22 belonging to the relay group 2 sends a signal to the destination node 300.

In a next time slot n+1, the relay nodes 11 and 12 belonging to the relay group 1 sends a signal to the destination node 300, and at the same time, the relay nodes 21 and 22 belonging to the relay group 2 receives a signal sent from the source node 100.

That is, in each time slot, at least equal to or more than two of the plural relay nodes belonging to one relay group receives a transmit signal from the source node 100, and at least equal to or more than two of the plural relay nodes belonging to another relay group sends a signal to the destination node 300 at the same time slot.

In the time slot n, the relay nodes 11 and 12 belonging to the relay group 1 receives an influence of a signal sent from the relay nodes 21 and 22 belonging to the relay group 2 as an interference signal component.

In the time slot n+1, the relay nodes 21 and 22 belonging to the relay group 2 receives an influence of a signal sent from the relay nodes 11 and 12 belonging to the relay group 1 as an interference signal component.

Figure 11:
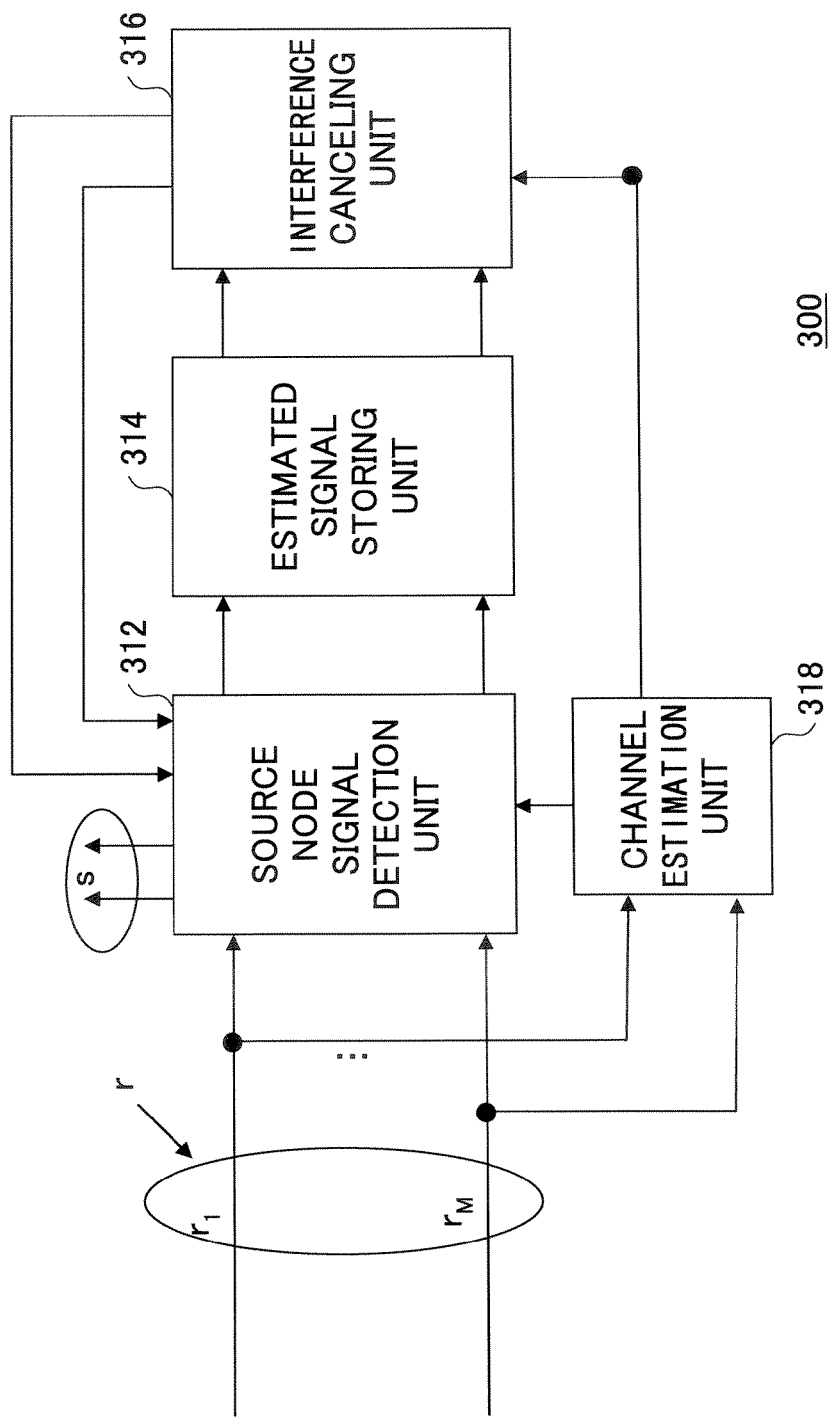
FIG. 11 is a block diagram of a destination node of an embodiment of the present invention.

A configuration of the destination node of this embodiment is shown in FIG. 11. The destination node includes a channel estimation unit 318 that receives a signal sent from a relay node, a source node signal detection unit 312 that receives an output of the channel estimation unit 318 and a signal sent from the relay node, an estimated signal storing unit 314 that receives an output signal from the source node signal detection unit 312, and an interference canceling unit 316 that receives an output of the estimated signal storing unit 314 and an output of the channel estimation unit 318. The output signal of the interference canceling unit 316 is supplied to the source node signal detection unit 312.

The source node signal detection unit 312 detects a signal sent from the source node 100 using the signal sent from each relay node (11, 12, 21, 22) using the forward channel of each relay node, and supplies the detected signal into the estimated signal storing unit 314.

The estimated signal storing unit 314 stores the signal estimated by the source node signal detection unit 312.

The interference canceling unit estimates a signal that causes interference using the estimated source node transmit signal estimated by the source node signal detection unit 312 and channel information obtained by multiplying the inter-relay node channel by the forward channel, and supplies the signal to the source node signal detection unit 312. The interference canceling unit 316 realizes interference cancellation by canceling a sum of all relay signals (estimated value) that cause interference from the receive signal.

The source node signal detection unit 312 detects the signal from the source node using the signal from which interference is canceled.

The channel estimation unit 318 estimates a product of channels between all relay nodes in the relay node 1 and each relay node in the relay group 2 and channels between the destination node and each relay nodes in the relay group 2, a product of channels between the source node 100 and all relay nodes in the relay group 2, channels between all relay nodes in the relay group 2 and each relay node in the relay group 1, and channels between the destination node and all relay nodes in the relay group 1, and a product of channels between the source node 100 and each relay node and channels between the destination node and each relay node, and a product of channels between the source node 100 and each relay node and channels between the destination node and each relay node.

For example, as estimation of channel information on the relay node 11, the channel estimation unit 318 estimates a product of a sum of a channel between the relay node 11 and the relay node 21 and a channel between the relay node 11 and the relay node 22, and the forward channel between the relay node 11 and the destination node, and estimates a product of a channel between the relay node 11 and the source node and the forward channel between the relay node 11 and the destination node.

Figure 12:
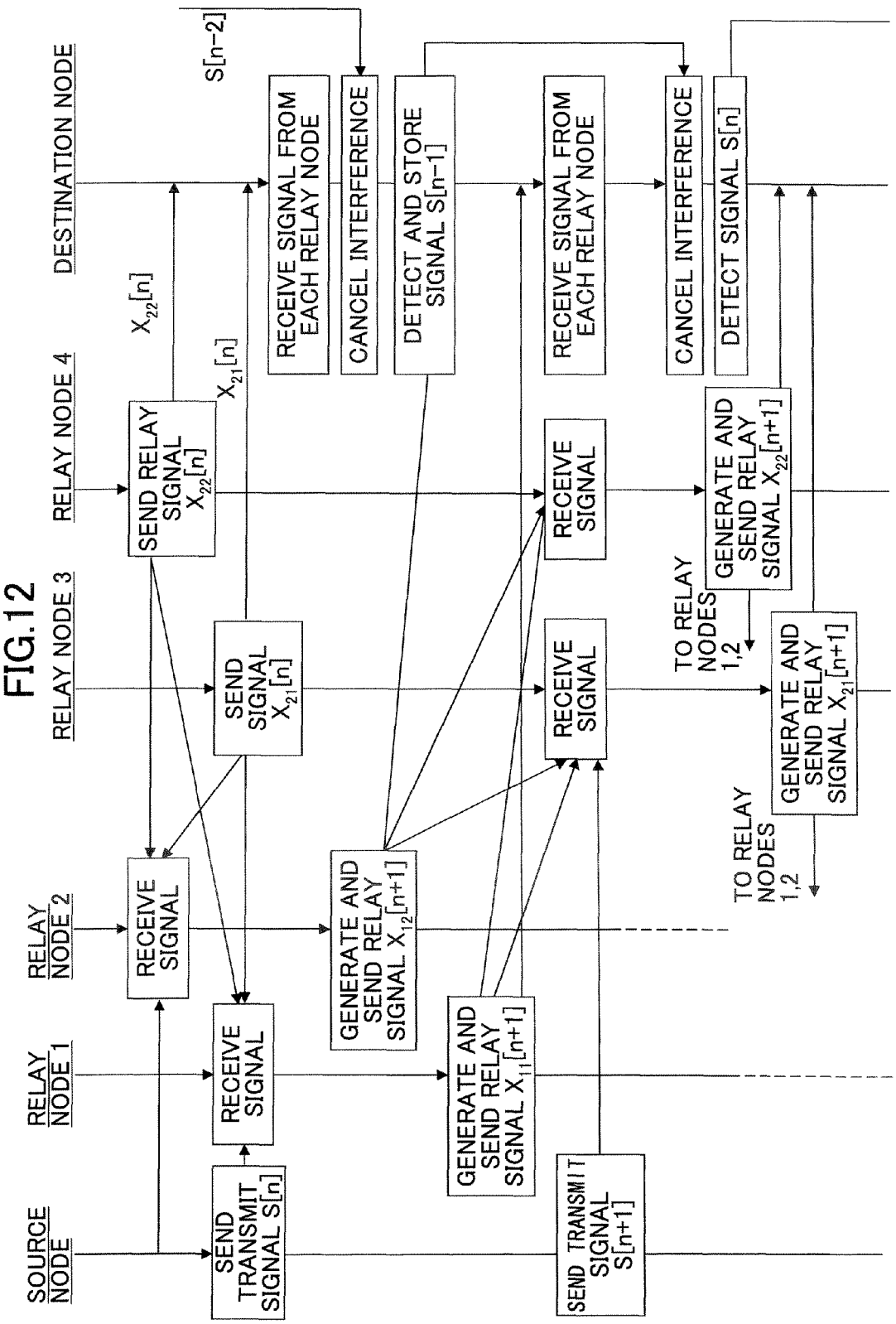
FIG. 12 is a flowchart showing a data relay method of an embodiment of the present invention.

Next, signal processing of the wireless communication system of this embodiment is described with reference to FIG. 12.

In this embodiment, each of the relay nodes 11, 12, 21 and 22 sends a received signal to the destination node 300 after adjusting the power of the received signal.

In a time slot n, the source node 100 sends a transmit signal s[n] to the relay nodes 11 and 12 belonging to the relay group 1. At the same time, the relay nodes 21 and 22 belonging to the relay group 2 sends relay signals $X_{21}[n]$ and $X_{22}[n]$ to the destination node 300.

The relay nodes 11 and 12 belonging to the relay group 1 receive the transmit signal s[n] and the relay signals $X_{21}[n]$ and $X_{22}[n]$. In this case, a receive signal of the relay node 11 is represented as the following equation (41).

$$y_{11}[n] = H_{11}s[n] + n_{11} + \sum_{l=1}^{2} A_{l1}[n]x_{2l}[n] \quad (41)$$

And, a receive signal of the relay node 12 is represented as the following equation (42).

$$y_{12}[n] = H_{12}s[n] + n_{12} + \sum_{l=1}^{2} A_{l1}[n]x_{2l}[n] \quad (42)$$

Since the same processes are performed in the relay nodes 11 and 12, only the processes of the relay node 11 are described hereinafter.

After multiplying the receive signal by $E_{11}[n+1]$ for adjusting the power of the receive signal, the relay node 11 sends a transmit signal $X_{11}[n+1]=E_{11}[n+1]y_{11}[n]$ to the destination node 300 in a time slot n+1. At the same time, the source node 100 sends a transmit signal s[n+1] to the relay nodes 21 and 22 in the time slot n+1.

Receive signals received by the destination node 300 in time slots n, n+1, and n+2 are represented as the following equations (43), (44) and (45) respectively.

$$r[n] = \sum_{l=1}^{2} G_{2l}[n]x_{2l}[n] + z \quad (43)$$

$$r[n+1] = \sum_{k=1}^{2} G_{1k}[n+1]x_{1k}[n+1] + z \quad (44)$$

$$r[n+2] = \sum_{l=1}^{2} G_{2l}[n+2]x_{2l}[n+2] + z \quad (45)$$

Next, the destination node 300 cancels interference occurring between relay nodes using the stored estimated source node transmit signal in the previous slot.

For example, the interference occurring between relay nodes included in the receive signal in the time slot n+1 can be canceled using the s[n−1] estimated from the equation (43) for the equation (44). More particularly, the interference signal component is canceled from the receive signal as shown in the following equation (46).

$$r[n+1] - \sum_{k=1}^{2} G_{1k}E_{1k}[n] \sum_{l=1}^{2} E_{2l}[n-1]A_{l1}[n-1] = \sum_{k=1}^{2} G_{1k}E_{1k}[n]\left(\begin{array}{c} H_{1k}s[n] + n_{1k} + \\ \sum_{l=1}^{2} A_{l1}[n]x_{2l}[n] \end{array}\right) + \quad (46)$$

$$H_{2l}s[n-1]$$

$$z - \sum_{k=1}^{2} G_{1k}E_{1k}[n] \sum_{l=1}^{2} E_{2l}[n-1]$$

$$A_{l1}[n-1]H_{2l}s[n-1]$$

$$= \sum_{k=1}^{2} G_{1k}E_{1k}[n]\left(\begin{array}{c} H_{1k}s[n] + n_{1k} + \\ \sum_{l=1}^{2} A_{l1}[n]n_{2l} \end{array}\right)$$

By performing the process shown in the equation (46), the interference signal component is canceled. After that, the transmit signal s[n] from the source node is detected. The result is used for detecting a signal s[n+1].

Next, a wireless communication system of a sixth embodiment of the present invention is described.

In the wireless communication system of this embodiment is divided into two relay groups 1 and 2, wherein each group includes more than one relay node. Each relay node sends a received signal as it is or after amplifying it. In addition, in the wireless communication system of this embodiment, one relay group performs receiving processes at the same time when another relay group performs sending processes.

Following parameters are defined before describing a wireless communication system of the present embodiment.

[n]: a variable of time provided to each variable, indicating a n-th time slot s: a transmit signal vector from a source node r: a receive signal vector K: number of usable relay nodes in the relay group 1

L: number of usable relay nodes in the relay group 2

$H_{ij}$: channel (backward channel) between a source node and a j-th relay node in an i-th relay group, $1 \leq i \leq 2$, $1 \leq j \leq K$ when i=1, $1 \leq j \leq L$ when i=2

$G_{ij}$: channel (forward channel) between a destination node and a j-th relay node of an i-th relay group, $1 \leq i \leq 2$, $1 \leq j \leq K$ when i=1, $1 \leq j \leq L$ when i=2

$A_{ij}$: channel matrix between an i-th relay node of the relay group 1 and a j-th relay node of the relay group 2

$n_{ij}$: noise component of the j-th relay node of the i-th relay group z: noise component of a receive node $\sigma_r^2$: noise power of a relay node (common to all relay nodes)

$\sigma_d^2$: noise power of a receive node

P: transmit power

E(·): ensemble mean value of variable

The wireless communication system of this embodiment is described with reference to FIG. 9.

The wireless communication system of this embodiment includes plural communication nodes that are divided into a source node (source node) 100, relay nodes and a destination node (receive node) 300. A transmit signal sent from the source node 100 is transmitted to the destination node 300 via one or more relay nodes.

The wireless communication system of this embodiment includes a source node 100, a relay group 1 including plural relay nodes (more than one), a relay group 2 including plural relay nodes (more than one), and a destination node 300.

In this embodiment, an example is described in which the number of the relay nodes in each of the relay groups 1 and 2 is 2, the number of antennas of each of the source node 100 and the destination node 300 is M, the number of antennas of the relay node is N, and N is equal to or more than twice M. But, each of the numbers K and L of the relay nodes in the relay groups may be more than two.

As shown in FIG. 9, in the time slot n, the relay nodes 11 and 12 belonging to the relay group 1 receives a signal sent from the source node 100, and at the same time, the relay nodes 21 and 22 belonging to the relay group 2 sends a signal to the destination node 300.

In a next time slot n+1, the relay nodes 11 and 12 belonging to the relay group 1 sends a signal to the destination node 300, and at the same time, the relay nodes 21 and 22 belonging to the relay group 2 receives a signal sent from the source node 100.

That is, in each time slot, at least equal to or more than two of the plural relay nodes belonging to one relay group receives a transmit signal from the source node 100, and at least equal to or more than two of the plural relay nodes belonging to another relay group sends a signal to the destination node 300 at the same time slot.

In the time slot n, the relay nodes 11 and 12 belonging to the relay group 1 receives an influence of a signal sent from the relay nodes 21 and 22 belonging to the relay group 2 as an interference signal component.

In the time slot n+1, the relay nodes 21 and 22 belonging to the relay group 2 receives an influence of a signal sent from the relay nodes 11 and 12 belonging to the relay group 1 as an interference signal component.

Figure 13:
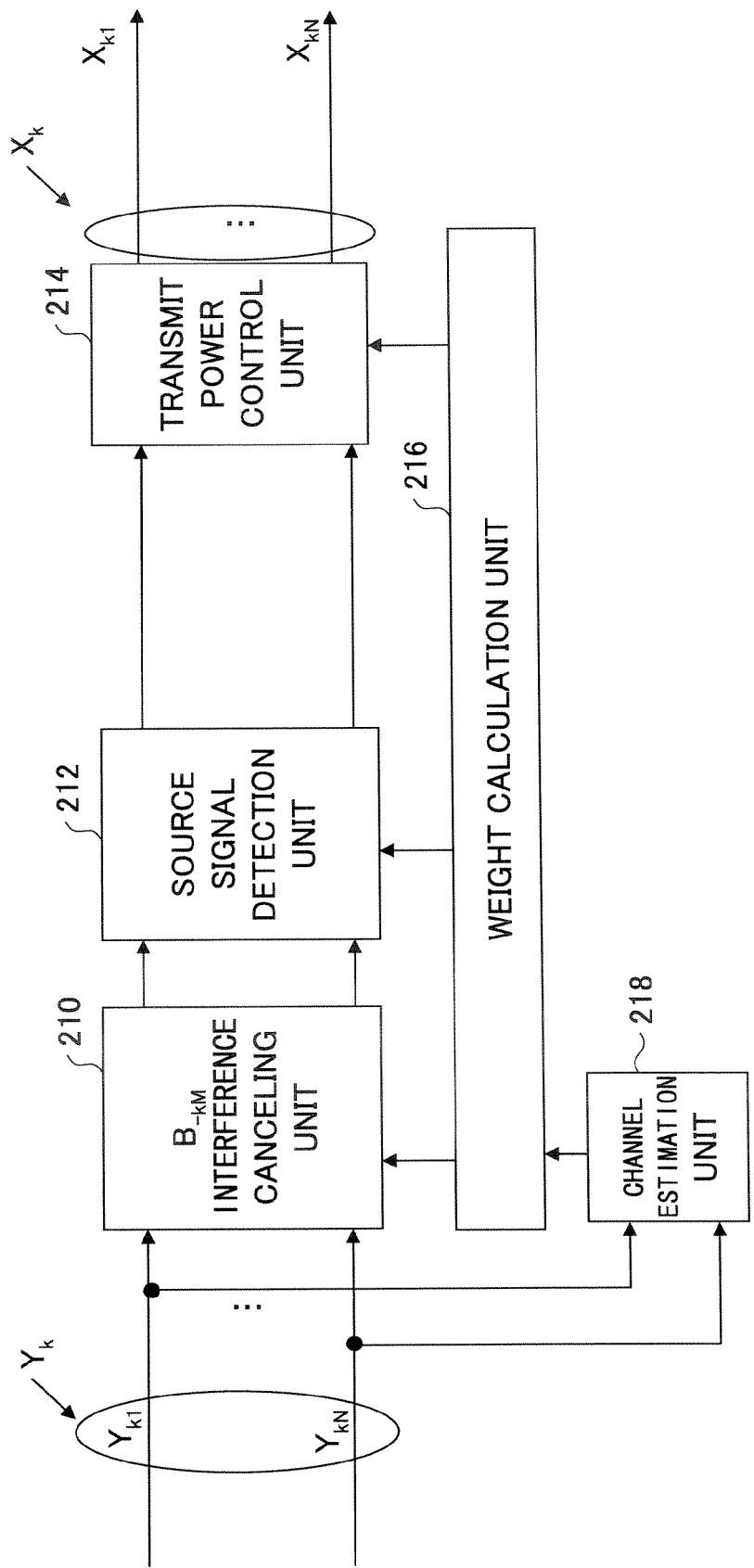
FIG. 13 is a block diagram of a relay node of an embodiment of the present invention.

A configuration of the relay node of this embodiment is shown in FIG. 13. The relay node includes a channel estimation unit 218 for estimating a channel between the source node 100 and the relay node and channels between the relay node and relay nodes of the different relay group, an interference canceling unit 210 for performing interference cancellation on a signal from the source node 100, a source node signal detection unit (source signal detection unit) 212 for receiving an output signal of the interference canceling unit 210 and detecting the source node signal, a transmit power control unit 214 that receives an output signal of the source node signal detection unit 212, and a weight calculation unit 216 that receives an output signal of the channel estimation unit 218. An output signal of the weight calculation unit 216 is supplied to the interference canceling unit, the source node signal detection unit 212, and the transmit power control unit 214.

In the following, a case is described as an example in which the plural relay nodes are divided to the relay group 1 including more than one relay node and the relay group 2 including more than one relay node. In this case, the relay node belongs to the relay group 1 or the relay group 2.

The channel estimation unit 218 of the relay node estimates channel information between the own relay node and the source node and estimates channel information between the own relay node and all relay nodes belonging to the relay group 2 when the own relay node belongs to the relay group 1, and the channel estimation unit 218 of the relay node estimates channel information between the own relay node and the source node and estimates channel information between the own relay node and all relay nodes belonging to the relay group 1 when the relay node belongs to the relay group 2.

The interference canceling unit 210 cancels an interference signal from other relay nodes based on the channel information estimated by the channel estimation unit 218.

The source node signal detection unit 212 detects a signal sent from the source node from the signal from which the interference signal is canceled.

Next, signal processing of the wireless communication system of this embodiment is described with reference to FIG. 14.

In this embodiment, each of the relay nodes 11, 12, 21 and 22 restores the source node transmit signal from a received signal, and sends the restored signal to the destination node.

In a time slot n, the source node 100 sends a transmit signal s[n] to the relay nodes 11 and 12. At the same time, the relay nodes 21 and 22 sends relay signals $X_{21}[n]$ and $X_{22}[n]$ respectively after adjusting the power to the destination node 300. The signals are represented as follows.

$$X_{21}[n] = E_{21}[n](s[n-1], s[n-1])^H \quad (47)$$

$$X_{22}[n] = E_{22}[n](s[n-1], s[n-1])^H \quad (48)$$

That is, the relay node that has N antennas that is more than twice the number M of antennas of the source node 100 copies the estimated source node transmit signal s[n−1] that was sent by the M antennas so as to send the relay signal using the N antennas, wherein the estimated source node transmit signal s[n−1] is stored in the previous time slot.

Each of the relay nodes 11 and 12 receives the transmit signal s[n] and the relay signals $X_{21}[n]$ and $X_{22}[n]$ of the relay group 2. In this case, the receive signal of the relay node 11 is represented by the following equation (49).

$$y_{11}[n] = H_{11}s[n] + n_{11} + \sum_{l=1}^{2} A_{l1}[n]x_{2l}[n] \quad (49)$$

The receive signal of the relay node 12 is represented by the following equation (50).

$$y_{12}[n] = H_{12}s[n] + n_{12} + \sum_{l=1}^{2} A_{l1}[n]x_{2l}[n] \quad (50)$$

Since the same processes are performed in the relay nodes 11 and 12, only the processes of the relay node 11 are described hereinafter.

After adjusting the power of the receive signal, the relay node 11 sends a transmit signal $X_{11}[n+1] = E_{11}[n+1](s[n], s[n])^H$ to the destination node 300. At the same time, the source node 100 sends a transmit signal s[n+1] to the relay nodes 21 and 22.

The equation (49) can be represented as follows from the equations (47) and (48)

$$y_{11}[n] = H_{11}s[n] + n_{11} + \sum_{l=1}^{2} A_{l1}[n]E_{2l}\binom{s[n-1]}{s[n-1]} \quad (51)$$

$$= H_{11}s[n] + n_{11} + B_{l1}[n]E_{2l}s[n-1]$$

In the equation, $B_{11}$ indicates a channel matrix of N×M, and an i-th (1≦i≦M) column is a sum of an i-th column and an (i+M)-the column of $A_{12}$(N×N).

Next, singular value decomposition (SVD) is performed on $B_{11}[n]$ as follows.

$$B_{11}[n] = (\tilde{U}[n], U[n])\binom{\Sigma[n]}{0}\tilde{V}^H[n] \quad (52)$$

$$\tilde{U}[n]^H \quad (53)$$

The interference component can be deleted by multiplying the receive signal (51) by the expression (53).

The receive signal received by the destination node 300 in the time slot n can be represented as the equation (54).

$$r[n] = \sum_{l=1}^{2} G_{2l}[n]s[n-1] + z \qquad (54)$$

The destination node 300 detects a transmit signal s[n−1] sent from the source node 100 using the receive signal shown as the equation (54). The communication node, the wireless communication system and the data relay method of the present invention can be applied to wireless communication systems.

As mentioned above, according to the fourth-sixth embodiments a communication node for receiving a signal sent from a source node via a relay node is provide. The communication node includes an interference canceling unit configured to cancel an interference signal caused between the relay nodes. The communication node receives the signal sent from the source node via plural relay nodes, and the plural relay nodes are divided into a first relay group including more than one relay node and a second relay group including more than one relay node, and the communication node further includes: a channel estimation unit configured to estimate channel information between the communication node and relay nodes in the first relay group, channel information between the communication node and relay nodes in the second relay group, channel information obtained by multiplying channels between the source node and each relay node by channels between the communication node and each relay node, channel information obtained by multiplying channels between each relay node in the first relay group and each relay node in the second relay group by channels between the communication node and each relay node in the second relay group, and channel information obtained by multiplying channels between each relay node in the second relay group and each relay node in the first relay group by channels between the communication node and each relay node in the first relay group; a transmit signal estimation unit configured to estimate a transmit signal based on the channel information estimated by the channel estimation unit; and a storing unit configured to store the transmit signal estimated by the transmit signal estimation unit, wherein the interference canceling unit cancels the interference signal based on the signal stored in the storing unit and the channel information estimated by the channel estimation unit so as to detect the signal sent from the source node.

In the above communication node, the may include: a channel estimation unit configured to estimate channel information that is a product of channels between the source node and relay nodes in the first relay group, channels between relay nodes in the first relay group and each relay node in the second relay group, and channels between the communication node and each relay node in the second relay group, estimate channel information that is a product of channels between the source node and relay nodes in the second relay group, channels between relay nodes in the second relay group and each relay node in the first relay group, and channels between the communication node and each relay node in the first relay group, and estimate channel information that is a product of channels between the source node and each relay node and channels between the communication node and each relay node; a transmit detection unit configured to detect a transmit signal from the source node based on the channel information estimated by the channel estimation unit; and a storing unit configured to store the transmit signal detected by the transmit signal detection unit, wherein the interference canceling unit cancels the interference signal based on the signal stored in the storing unit and the channel information estimated by the channel estimation unit so as to detect the signal sent from the source node.

A communication node for relaying a signal between a source node and a destination node is also provided and the communication node includes: a relay signal generation unit configured to generate a transmit signal by reducing, from a receive signal, an interference signal from another communication node and performing a process such that the transmit signal is not received as an interference signal by another communication node.

The communication node is one of plural relay nodes for relaying a signal between the source node and the destination node, and the plural relay nodes are divided into a first relay group including more than one relay node and a second relay group including more than one relay node, and the communication node belongs to the first relay group or the second relay group, and the communication node may further includes: a channel estimation unit configured to estimate channel information between the communication node and the source node and channel information between the communication node and relay nodes in the second relay group when the communication node belongs to the first relay group, and estimate channel information between the communication node and the source node and channel information between the communication node and relay nodes in the first relay group when the communication node belongs to the second relay group; an interference canceling unit configured to cancel an interference signal from another relay node based on channel the information estimated by the channel estimation unit, and wherein the relay signal generation unit detects the signal sent from the source node from the signal from which the interference signal is canceled.

The present invention is not limited to the specifically disclosed embodiments, and variations and modifications may be made without departing from the scope of the invention.

The present application contains subject matter related to Japanese patent application No. 2005-349727, filed in the JPO on Dec. 2, 2005, and Japanese patent application No. 2006-069777, filed in the JPO on Mar. 14, 2006, the entire contents of which are incorporated herein by reference.

What is claimed is:

1. A communication node for relaying a signal between a source node and a destination node, the communication node being used as a first relay node in a system which includes the first relay node, a second relay node, the source node and the destination node, the communication node comprising:

a relay signal generation unit configured to generate a transmit signal by reducing, from a receive signal, an interference signal received from the second relay node and by performing a process such that the transmit signal is not received as an interference signal by the second relay node, wherein the first relay node receives a first transmit signal from the source node in a first time slot, and the second relay node transmits a first relay signal to the destination node in the first time slot, and the second relay node receives a second transmit signal from the source node in a second time slot, which is the next time slot relative to the first time slot, and the first relay node transmits a second relay signal generated based on the first transmit signal to the destination node in the second time slot.

2. The communication node as claimed in claim 1, further comprising:
   a channel estimation unit configured to estimate channel information between the communication node and the source node, and channel information between the communication node and second relay node; and
   an interference canceling unit configured to cancel the interference signal sent from the second relay node from the receive signal based on the channel information between the communication node and the source node, and channel information between the communication node and the second relay node;
   wherein the relay signal generation unit detects a signal sent from the source node from the receive signal from which the interference signal is canceled.

3. A communication node as claimed in claim 2, wherein the relay signal generation unit multiplies the detected signal sent from the source node by a weight.

4. A communication node for relaying a signal between a source node and a destination node, the communication node being used as a first relay node in a system which includes the first relay node, a second relay node, the source node and the destination node, the communication node comprising:
   a relay signal generation unit configured to generate a transmit signal by reducing, from a receive signal, an interference signal received from the second relay node and by performing a process such that the transmit signal is not received as an interference signal by the second relay node;
   a channel estimation unit configured to estimate channel information between the communication node and the source node, channel information between the communication node and the second relay node, and channel information between the communication node and the destination node;
   an interference canceling matrix calculation unit configured to obtain an interference canceling matrix for canceling the interference signal received from the second relay node based on the channel information between the communication node and the source node and the channel information between the communication node and the second relay node; and
   a causing interference suppressing matrix calculation unit configured to obtain a causing interference suppressing matrix for suppressing interference to be caused by the transmit signal in the second relay node based on the channel information between the communication node and the destination node,
   wherein the relay signal generation unit multiplies the receive signal by the interference canceling matrix and the causing interference suppression matrix.

5. A communication node, which is used as a destination node in a system which includes a first relay node, a second relay node, a source node and the destination node, the communication node comprising:
   an estimation unit configured to estimate a relay signal sent by the first relay node based on a first received signal received from the first relay node;
   a storing unit configured to store the relay signal estimated by the estimation unit;
   an interference canceling unit configured to cancel an interference signal from a second received signal received from the second relay node by using the relay signal stored in the storing unit in order to detect a signal sent from the source node,
   wherein the first relay node receives a first transmit signal from the source node in a first time slot, and the second relay node transmits a first relay signal to the destination node in the first time slot, and
   the second relay node receives a second transmit signal from the source node in a second time slot, which is the next time slot relative to the first time slot, and the first relay node transmits a second relay signal generated based on the first transmit signal to the destination node in the second time slot.

6. The communication node as claimed in claim 5, the communication node further comprising:
   a channel estimation unit configured to estimate channel information which is obtained by multiplying a channel between the first and the second relay nodes by a channel between the communication node and the first relay node, and estimate channel information between the communication node and the first relay node;
   a transmit signal estimation unit configured to estimate a transmit signal based on the plural channel information estimated by the channel estimation unit; and
   the storing unit being configured to store the transmit signal estimated by the transmit signal estimation unit,
   wherein the interference canceling unit cancels the interference signal based on the transmit signal which is estimated by the transmit signal estimation unit and which is stored in the storing unit, and the channel information is estimated by the channel estimation unit so as to detect the signal sent from the source node.

7. The communication node as claimed in claim 5, wherein the communication node receives the signal sent from the source node via plural relay nodes, and the plural relay nodes are divided into a first relay group including more than one relay node and a second relay group including more than one relay node, the communication node further comprising:
   a channel estimation unit configured to estimate channel information between the communication node and relay nodes in the first relay group, channel information between the communication node and relay nodes in the second relay group, channel information obtained by multiplying channels between the source node and each relay node of the plural relay nodes by respective channels between the communication node and each relay node of the plural relay nodes, channel information obtained by multiplying channels between each relay node in the first relay group and each relay node in the second relay group by channels between the communication node and each relay node in the second relay group, and channel information obtained by multiplying channels between each relay node in the second relay group and each relay node in the first relay group by channels between the communication node and each relay node in the first relay group;
   a transmit signal estimation unit configured to estimate a transmit signal based on the plural channel information estimated by the channel estimation unit; and
   the storing unit being configured to store the transmit signal estimated by the transmit signal estimation unit,
   wherein the interference canceling unit cancels the interference signal based on the transmit signal which is estimated by the transmit signal estimation unit and which is stored in the storing unit, and the channel information is estimated by the channel estimation unit so as to detect the signal sent from the source node.

8. The communication node as claimed in claim 5, wherein the communication node receives the signal sent from the source node via plural relay nodes, and plural relay nodes are divided into a first relay group including more than one relay node and a second relay group including more than one relay node, the communication node further comprising:

a channel estimation unit configured to estimate channel information that is obtained by multiplying channels between the source node and relay nodes in the first relay group with each other, multiplying channels between relay nodes in the first relay group and each relay node in the second relay group with each other, and multiplying channels between the communication node and each relay node in the second relay group with each other, estimate channel information that is obtained by multiplying channels between the source node and relay nodes in the second relay group with each other, multiplying channels between relay nodes in the second relay group and each relay node in the first relay group with each other, and multiplying channels between the communication node and each relay node in the first relay group with each other, and estimate channel information that is obtained by multiplying channels between the source node and each relay node of the plural relay nodes by respective channels between the communication node and each relay node of the plural relay nodes;

a transmit detection unit configured to detect a transmit signal from the source node based on the plural channel information estimated by the channel estimation unit; and the storing unit being configured to store the transmit signal detected by the transmit signal detection unit, wherein the interference canceling unit cancels the interference signal based on the transmit signal which is detected by the transmit signal detection unit and which is stored in the storing unit, and the plural channel information is estimated by the channel estimation unit so as to detect the signal sent from the source node.

9. A wireless communication system comprising:

a source node;

a destination node;

a first relay node for relaying a signal between the source node and the destination node; and a second relay node, wherein the first relay node includes a relay signal generation unit configured to generate a transmit signal by reducing, from a receive signal, an interference signal received from the second relay node and by performing a process such that the transmit signal is not received as an interference signal by the second relay node, wherein the first relay node receives a first transmit signal from the source node in a first time slot, and the second relay node transmits a first relay signal to the destination node in the first time slot, and the second relay node receives a second transmit signal from the source node in a second time slot, which is the next time slot relative to the first time slot, and the first relay node transmits a second relay signal generated based on the first transmit signal to the destination node in the second time slot.

10. A wireless communication system comprising:

a source node;

a first relay node;

a second relay node; and a destination node for receiving a signal sent from the source node via the first relay node, the destination node comprising:

an estimation unit configured to estimate a relay signal sent by the first relay node based on a first received signal received from the first relay node;

a storing unit configured to store the relay signal estimated by the estimation unit; and an interference canceling unit configured to cancel an interference signal from a second received signal received from the second relay node by using the relay signal stored in the storing unit in order to detect a signal sent from the source node, wherein the first relay node receives a first transmit signal from the source node in a first time slot, and the second relay node transmits a first relay signal to the destination node in the first time slot, and the second relay node receives a second transmit signal from the source node in a second time slot, which is the next time slot relative to the first time slot, and the first relay node transmits a second relay signal generated based on the first transmit signal to the destination node in the second time slot.

11. A data relay method in a wireless communication system comprising a first relay node, a second relay node, a source node, and a destination node, the first relay node for relaying a signal between the source node and the destination node, the method comprising:

generating, at the first relay node, a transmit signal by reducing, from a receive signal, an interference signal received from the second relay node and by performing a process such that the transmit signal is not received as an interference signal by the second relay node, wherein the first relay node receives a first transmit signal from the source node in a first time slot, and the second relay node transmits a first relay signal to the destination node in the first time slot, and the second relay node receives a second transmit signal from the source node in a second time slot, which is the next time slot relative to the first time slot, and the first relay node transmits a second relay signal generated based on the first transmit signal to the destination node in the second time slot.

12. A data relay method in a wireless communication system comprising a first relay node, a second relay node, a source node, and a destination node, the destination node for receiving a signal sent from the source node via the first relay node, the method comprising:

estimating, at an estimation unit of the destination node, a relay signal sent by the first relay node based on a first received signal received from the first relay node;

storing, at a storing unit of the destination node, the relay signal estimated by the estimation unit; and canceling, at an interference canceling unit of the destination node, an interference signal from a second received signal received from the second relay node by using the relay signal stored in the storing unit in order to detect a signal sent from the source node, wherein the first relay node receives a first transmit signal from the source node in a first time slot, and the second relay node transmits a first relay signal to the destination node in the first time slot, and the second relay node receives a second transmit signal from the source node in a second time slot, which is the next time slot relative to the first time slot, and the first relay node transmits a second relay signal generated based on the first transmit signal to the destination node in the second time slot.

13. A communication node for relaying a signal between a source node and a destination node, the communication node being used as a first relay node in a system which includes the first relay node, a second relay node, the source node and the destination node, the communication node comprising:

- a relay signal generation unit configured to generate a transmit signal by reducing, from a receive signal, an interference signal received from the second relay node and by performing a process such that the transmit signal is not received as an interference signal by the second relay node,
- wherein the communication node is one of plural relay nodes for relaying a signal between the source node and the destination node, and the plural relay nodes are divided into a first relay group including more than one relay node and a second relay group including more than one relay node, and the communication node belongs to the first relay group or the second relay group, the communication node further comprising:
- a channel estimation unit configured to estimate channel information between the communication node and the source node and channel information between the communication node and relay nodes in the second relay group when the communication node belongs to the first relay group, and estimate channel information between the communication node and the source node and channel information between the communication node and relay nodes in the first relay group when the communication node belongs to the second relay group;
- an interference canceling unit configured to cancel an interference signal from the second relay node based on the channel information estimated by the channel estimation unit, and
- wherein the relay signal generation unit detects the signal sent from the source node from the signal from which the interference signal is canceled.

* * * * *